United States Patent
Handa et al.

(10) Patent No.: US 11,037,592 B2
(45) Date of Patent: Jun. 15, 2021

(54) RESIN FILM WITH CONTROLLED YOUNGS MODULUS

(71) Applicant: TEIJIN FILM SOLUTIONS LIMITED, Tokyo (JP)

(72) Inventors: Makoto Handa, Tokyo (JP); Amane Hirose, Tokyo (JP); Tatsuya Ogawa, Osaka (JP); Mitsuo Tojo, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 125 days.

(21) Appl. No.: 16/211,887

(22) Filed: Dec. 6, 2018

(65) Prior Publication Data

US 2019/0180781 A1 Jun. 13, 2019

(30) Foreign Application Priority Data

| Dec. 7, 2017 | (JP) | ............................. JP2017-235214 |
| Dec. 7, 2017 | (JP) | ............................. JP2017-235215 |
| May 11, 2018 | (JP) | ............................. JP2018-092227 |
| May 11, 2018 | (JP) | ............................. JP2018-092230 |

(51) Int. Cl.
| *G11B 5/73* | (2006.01) |
| *G11B 5/012* | (2006.01) |
| *G11B 15/43* | (2006.01) |

(52) U.S. Cl.
CPC .......... *G11B 5/73927* (2019.05); *G11B 5/012* (2013.01); *G11B 5/73923* (2019.05); *G11B 15/43* (2013.01); *B32B 2307/208* (2013.01); *B32B 2307/538* (2013.01); *B32B 2307/54* (2013.01)

(58) Field of Classification Search
None
See application file for complete search history.

(56) References Cited

U.S. PATENT DOCUMENTS

| 5,431,976 | A * | 7/1995 | Etchu | .......................... B32B 27/36 |
| | | | | 428/847.4 |
| 5,441,800 | A * | 8/1995 | Utsumi | .................... G11B 5/73 |
| | | | | 428/323 |
| 6,338,890 | B1 * | 1/2002 | Kobayashi | .............. B32B 27/36 |
| | | | | 428/141 |
| 6,485,810 | B1 * | 11/2002 | Uchida | ................... B29C 55/12 |
| | | | | 428/141 |
| 6,770,351 | B1 * | 8/2004 | Kobayashi | ............... G11B 5/73 |
| | | | | 428/847.3 |
| 6,773,802 | B2 * | 8/2004 | Kobayashi | .............. B32B 27/36 |
| | | | | 428/847.4 |
| 7,158,339 | B2 | 1/2007 | Kuse et al. | |
| 8,216,704 | B2 * | 7/2012 | Kinoshita | ............... B32B 27/20 |
| | | | | 428/483 |
| 2005/0260458 | A1 * | 11/2005 | Hirai | ...................... G11B 5/584 |
| | | | | 428/845.6 |
| 2006/0072235 | A1 | 4/2006 | Kuse et al. | |
| 2007/0076316 | A1 | 4/2007 | Kuse et al. | |
| 2007/0230054 | A1 * | 10/2007 | Takeda | ................. G11B 5/7305 |
| | | | | 360/134 |
| 2007/0281186 | A1 * | 12/2007 | Yoshida | .................. C08L 25/06 |
| | | | | 428/847.4 |
| 2011/0039127 | A1 * | 2/2011 | Kinoshita | ............... B32B 27/08 |
| | | | | 428/847.4 |
| 2017/0081482 | A1 * | 3/2017 | Hanan | ...................... C08J 3/226 |

FOREIGN PATENT DOCUMENTS

| JP | 2005-285196 | 10/2005 |
| JP | 2005-285268 | 10/2005 |
| JP | 2006-099919 | 4/2006 |
| JP | 2010-003116 | 1/2010 |

* cited by examiner

*Primary Examiner* — Kevin M Bernatz
(74) *Attorney, Agent, or Firm* — Wenderoth, Lind & Ponack, L.L.P.

(57) ABSTRACT

To provide a resin film, of which dimensional stability required of an ultra-high density recording medium can be controlled easily by drive tension, and which has processability at high temperature in a processing step of the resin film into a magnetic recording medium. A resin film having a Young's modulus in the film longitudinal direction of 1 GPa or more and a film thickness of 1 μm or more, wherein the product of the Young's modulus in the longitudinal direction and the thickness is 5 GPa·μm or more and 20 GPa·μm or less and wherein a dimensional change in the film longitudinal direction is −2% or more and +2% or less when the film is heated at a rate of 5° C./min under a load of 2 kg/mm² applied in the longitudinal direction and the temperature has reached 110° C., the resin film satisfying at least either of the following (1) or (2): (1) the Young's modulus in the film longitudinal direction is 6 GPa or less and the film thickness is 4.5 μm or less; and (2) the Young's modulus in the film longitudinal direction is 4 GPa or less and the film thickness is 6 μm or less.

9 Claims, 2 Drawing Sheets

RESIN FILM WITH CONTROLLED YOUNGS MODULUS

BACK OF THE INVENTION

Field of the Invention

The present invention relates to a resin film which, in applications which require extremely high dimensional stability such as a base film and the like used for an ultra-high density recording medium exceeding 10 Tb, allows easy adjustment of the tape width to a constant value by controlling tension to the recording medium in a magnetic recording and reproducing device and which has excellent processability into a magnetic recording medium.

DESCRIPTION OF THE RELATED ART

In recent years, with increase in amount of data that need to be treated in a computer system and the like, a significant increase in recording capacity of a magnetic recording medium has been desired. Up to now, even though attempts to improve dimensional stability of a substrate used for a magnetic recording medium have also been made (Patent Literature 1), improvement of substrate dimensional stability with an inexpensive material is reaching a limit. Furthermore, there have been made proposals (Patent Literature 2 to 4) that a track position at the time of recording falls into a range of a reproducing head by matching the tape widths at the time of data recording and data reproduction by controlling tape tension by devising a drive device which reproduces stored data from the magnetic recording medium. These techniques aim to converge tape widths at the time of recording and reproduction in an allowable range by causing the tape to change its dimension in the longitudinal direction by changing tension of the tape in the longitudinal direction and simultaneously causing the dimension of the tape in the width direction to change according to the Poisson's ratio of the recording medium. However, when a conventional high rigidity magnetic recording medium substrate is used, adjustment of the tape width by tape tension requires a large change in the tension to be applied. In recent years, tension in a reproducing device of a tape for high-density recording is set to become as small as possible in order to suppress an irreversible change of the magnetic recording tape by creep deformation. Thus, when a conventional high rigidity substrate is used, the range of adjustment of the tape width is limited to a very small region and it becomes difficult to increase the recording density significantly by an increase in the number of tracks. Thus, further improvement has been desired. On the other hand, when a low rigidity substrate is used, it becomes easy to adjust the tape width by controlling tape tension. However, in the processing step into a magnetic recording medium, the substrate itself stretches and tends to buckle in a step where a magnetic material is coated on the substrate and dried, causing a problem that a good magnetic recording medium becomes impossible to obtain.

CITATION LIST

Patent Literature

Patent Literature 1: Japanese Patent Laid-Open Publication No. 2010-3116
Patent Literature 2: Reference 2 (Japanese Patent Laid-Open Publication No. 2005-285196
Patent Literature 3: Japanese Patent Laid-Open Publication No. 2005-285268
Patent Literature 4: Japanese Patent Laid-Open Publication No. 2006-099919

BRIEF SUMMARY OF THE INVENTION

Technical Problem

An object of the present invention is to provide a resin film for a magnetic recording medium substrate, which enables an increase in track density by tape tension control as a means for realizing a significant increase in track density required of an ultra-high density magnetic recording medium, enables a large dimensional change with a small change in tension, and has excellent processability into a magnetic recording medium.

Solution to Problem

The present inventors conducted diligent research in order to solve the above problem and, as a result, have reached the present invention by making it possible to satisfy both of easy width control by tape tension and processability into a magnetic recording medium, which has hitherto been difficult.

Thus, according to the present invention, there is provided a resin film having a Young's modulus in the film longitudinal direction of 1 GPa or more and a film thickness of 1 µm or more, wherein the product of the Young's modulus in the longitudinal direction and the thickness is 5 GPa·µm or more and 20 GPa·µm or less and wherein a dimensional change in the film longitudinal direction is −2% or more and +2% or less when the film is heated at a rate of 5° C./min under a load of 2 kg/mm$^2$ applied in the longitudinal direction and the temperature has reached 110° C., the resin film satisfying at least either of the following (1) or (2): (1) the Young's modulus in the film longitudinal direction is 6 GPa or less and the film thickness is 4.5 µm or less; and (2) the Young's modulus in the film longitudinal direction is 4 GPa or less and the film thickness is 6 µm or less.

More specifically, according to the present disclosure, the following embodiments are also provided.

As a first embodiment, there is provided a resin film having a Young's modulus in the film longitudinal direction of 1 GPa or more and 6 GPa or less and a film thickness of 1 µm or more and 4.5 µm or less, wherein the product of the Young's modulus in the longitudinal direction and the thickness is 5 GPa·µm or more and 20 GPa·µm or less and wherein a dimensional change in the film longitudinal direction is −2% or more and +2% or less when the temperature is raised from 30° C. to 110° C. under a load of 2 kg/mm$^2$ applied in the longitudinal direction.

As a second embodiment, there is provided a resin film having a Young's modulus in the film longitudinal direction of 1 GPa or more and 4 GPa or less and a film thickness of 1 µm or more and 6 µm or less, wherein the product of the Young's modulus in the longitudinal direction and the thickness is 5 GPa·µm or more and 20 GPa·µm or less and wherein a dimensional change in the film longitudinal direction is −2% or more and +2% or less when the temperature is raised from 30° C. to 110° C. under a load of 2 kg/mm$^2$ applied in the longitudinal direction.

As a third embodiment, there is provided a polyester film formed of a copolyester in which dimer components represented by the following formulas (I) and (II): —C(O)—RA-C(O)— (I) and —O—RA-O— (II), wherein RA in the structural formulas (I) and (II) represents a $C_{31}$-$C_{51}$ alkylene group which may contain a cyclic ring(s) and a branched chain(s), are copolymerized in the range of 0.3 to less than 5 mol % based on the number of moles of repeating units of the polyester, wherein the polyester film has a Young's modulus in the longitudinal direction of 1 GPa or more and 6 GPa or less and a thickness of 1 µm or more and 4.5 µm or less, wherein the product of the Young's modulus in the longitudinal direction and the thickness is 5 GPa·µm or more and 20 GPa·µm or less, and wherein elongation in the film longitudinal direction is −2% or more and +2% or less when the film is heated from 30° C. to 110° C. at a rate 5° C./min under a load of 2 kg/mm² applied in the longitudinal direction.

As a fourth embodiment, there is provided a laminated polyester film, composed of two or more layers, the front and rear surfaces of which having different degrees of roughness, wherein an average surface roughness Ra of a flatter layer is 0.5 nm or more and less than 4.0 nm, and at least one layer being formed of a copolyester in which dimer components represented by the following formulas (I) and (II): —C(O)-RA-C(O)— (I) and —O—RA-O— (II), wherein RA in the structural formulas (I) and (II) represents a $C_{31}$-$C_{51}$ alkylene group which may contain a cyclic ring(s) and a branched chain(s), are copolymerized in the range of 0.3 to less than 5 mol % based on the number of moles of repeating units of the polyester, wherein the polyester film has a Young's modulus of 1 GPa or more and 6 GPa or less in the film longitudinal direction and a film thickness of 1 µm or more and 4.5 µm or less, wherein the product of the Young's modulus in the longitudinal direction and the thickness is 5 GPa·µm or more and 20 GPa·µm or less, and wherein elongation in the film longitudinal direction is −2% or more and +2% or less when the film is heated from 30° C. to 110° C. at a rate 5° C./min under a load of 2 kg/mm² applied in the longitudinal direction.

Advantageous Effects of the Invention

The resin film of the present invention can, in a base film and the like used for an ultra-high-density recording medium for 10 Tb or more, realize high-density recording by making adjustment of tape width by tape tension easy and provide data storage free from occurrence of wrinkles and the like during processing into a magnetic recording medium.

Further, according to the present invention, in a base film and the like used for an ultra-high-density recording medium for 10 Tb or more, adjustment of tape width by tape tension is easy while improving dimensional stability against environmental changes such as temperature and humidity and, moreover, occurrence of wrinkles and the like is suppressed during processing into a magnetic recording medium, and thus it is also possible to provide an excellent data storage tape.

Furthermore, in a base film and the like used in an ultra-high-density recording medium for 10 Tb or more, the polyester film of the present invention enables easy adjustment of tape width by tape tension while improving dimensional stability against environmental changes such as temperature and humidity, has moreover excellent traveling performance, is suppressed from occurrence of wrinkles and the like during processing into a magnetic recording medium, and thus can also provide an excellent data storage tape.

REFERENCE SIGNS LIST

Figure 1:
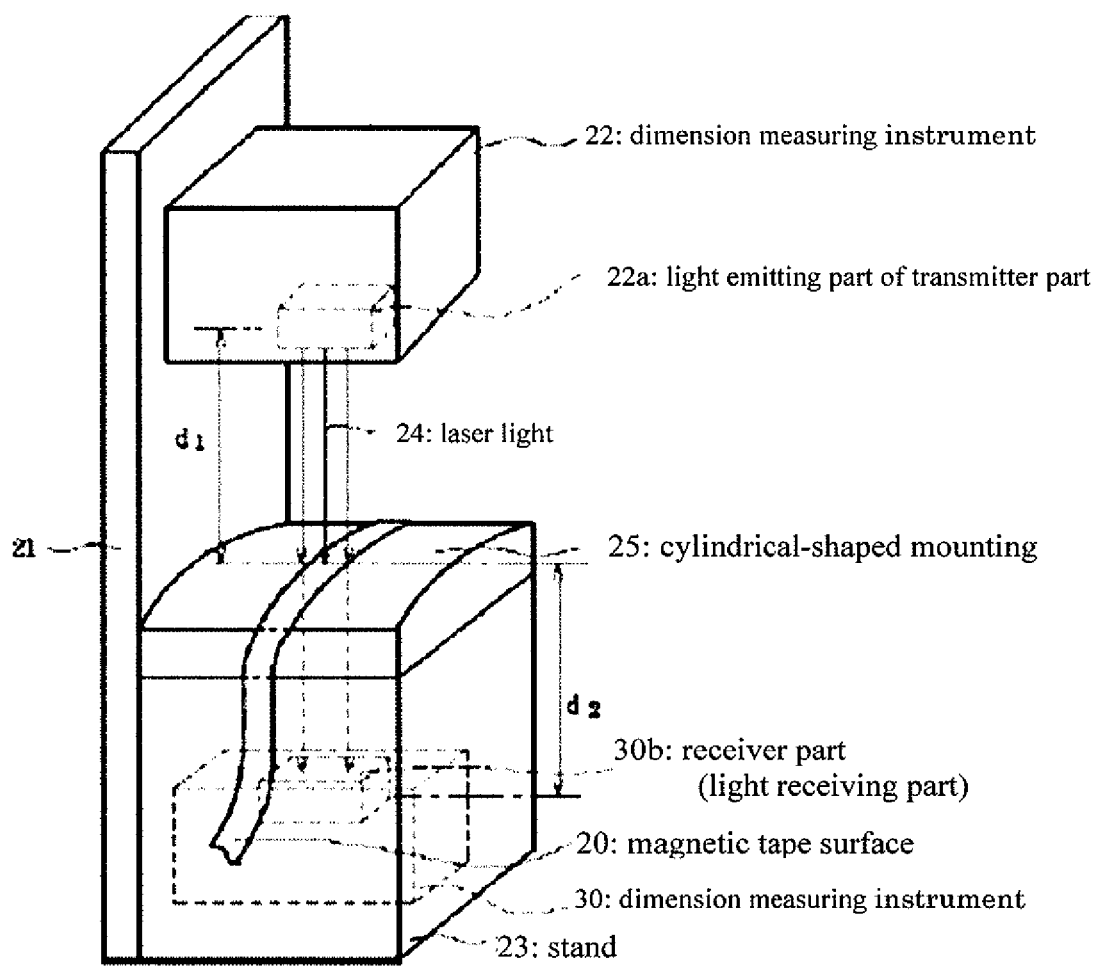
FIG. 1 is a perspective diagram of the dimension measuring instrument used in the present invention
Figure 2:
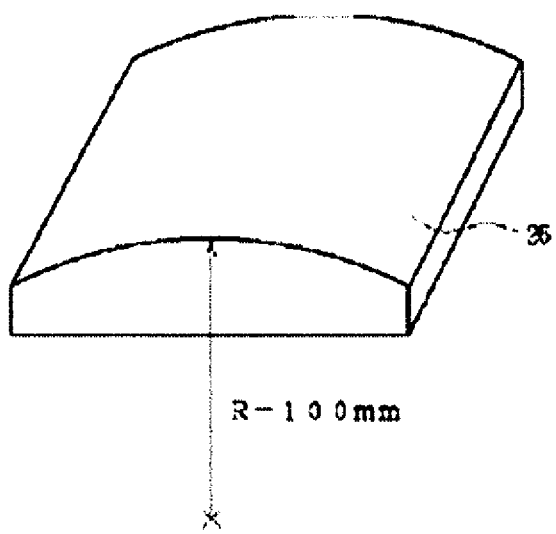
FIG. 2 is a schematic diagram indicating the curvature radius of the mounting surface in FIG. 1

20: magnetic tape, 21, 23: stand, 22: dimension measuring instrument, 22a: light emitting part of transmitter part, 30: receiver part, 30b: light receiving part of receiver part, 24: laser light, 25: cylindrical-shaped mounting surface

DESCRIPTION OF EMBODIMENTS

Hereinafter, the present invention will be described in detail. In addition, for convenience of explanation, the film forming direction may sometimes be referred to as machine direction, longitudinal direction, lengthwise direction, or MD direction, and a direction orthogonal to the film forming direction and thickness direction is sometimes referred to as width direction, lateral direction, or TD direction.

As the resin film of the present invention, there is provided a resin film having a Young's modulus in the film longitudinal direction of 1 GPa or more and a film thickness of 1 µm or more, wherein the product of the Young's modulus in the longitudinal direction and the thickness is 5 GPa·µm or more and 20 GPa·µm or less and wherein a dimensional change in the film longitudinal direction is −2% or more and +2% or less when the film is heated at a rate of 5° C./min under a load of 2 kg/mm² applied in the longitudinal direction and the temperature has reached 110° C., the resin film satisfying at least either of the following (1) or (2):
(1) the Young's modulus in the film longitudinal direction is 6 GPa or less and the film thickness is 4.5 µm or less; and
(2) the Young's modulus in the film longitudinal direction is 4 GPa or less and the film thickness is 6 µm or less.

In (1) above, when the Young's modulus and film thickness exceed the upper limits, it becomes necessary, when the resin film is processed into a magnetic recording medium, to apply a larger tension change when performing a dimensional control in the width direction by controlling tape tension of a reproducing device. In (1), the upper limit of the Young's modulus in the longitudinal direction is preferably 5.5 GPa or less, more preferably 5 GPa or less, and especially preferably 4.5 GPa or less; and the upper limit of the thickness is preferably 4 µm or less and more preferably 3.5 µm or less.

In (2) above, when the Young's modulus and film thickness exceed the upper limits, it becomes necessary, when the resin film is processed into a magnetic recording medium, to apply a larger tension change when performing a dimensional control in the width direction by controlling tape tension of a reproducing device. In (2) the upper limit of the Young's modulus in the longitudinal direction is preferably 3.9 GPa or less, more preferably 3.8 GPa or less, and especially preferably 3.7 GPa or less; and the upper limit of the thickness is preferably 5.5 µm or less, and more preferably 5 µm or less.

The resin film of the present invention satisfies at least either of the aforementioned (1) and (2). The aforementioned (1) and (2) will be described as the first embodiment and the second embodiment, respectively.

In the first embodiment, the resin film has a Young's modulus in the film longitudinal direction of 1 GPa or more and 6 GPa or less. When the Young's modulus is less than the lower limit, handling of a thin film is very difficult and, when the Young's modulus exceeds the upper limit, it becomes necessary, when the resin film is processed into a magnetic recording medium, to apply a larger tension change when performing a dimensional control in the width direction by controlling tape tension of a reproducing device. The lower limit of the Young's modulus in the longitudinal direction is preferably 1.5 GPa or more, more preferably 2 GPa or more, and especially preferably 2.5 GPa or more; and the upper limit is preferably 5.5 GPa or less, more preferably 5 GPa or less, and especially preferably 4.5 GPa or less.

In the film of the first embodiment, its thickness is 1 μm or more and 4.5 μm or less. When the thickness is less than the lower limit, handling of the film becomes very difficult and the film becomes easy to break when forming a film, thus such a film is not suitable. When the thickness exceeds the upper limit, it becomes necessary, when the resin film is processed into a magnetic recording medium, to apply a larger tension change when performing a dimensional control in the width direction by controlling tape tension of a reproducing device. The lower limit of the thickness is preferably 1.5 μm or more, and more preferably 2 μm or more; and the upper limit is preferably 4 μm or less, and more preferably 3.5 μm or less.

In the second embodiment, the Young's modulus in the film longitudinal direction is 1 GPa or more and 4 GPa or less. When the Young's modulus is less than the lower limit, handling of a thin film is very difficult and, when the Young's modulus exceeds the upper limit, it becomes necessary, when the resin film is processed into a magnetic recording medium, to apply a larger tension change when performing a dimensional control in the width direction by controlling tape tension of a reproducing device. The lower limit of the Young's modulus in the longitudinal direction is preferably 1.5 GPa or more, more preferably 2 GPa or more, and especially preferably 2.5 GPa or more; and the upper limit is preferably 3.9 GPa or less, more preferably 3.8 GPa or less, and especially preferably 3.7 GPa or less.

In the film of the second embodiment, its thickness is 1 μm or more and 6 μm or less. When the thickness is less than the lower limit, handling of the film becomes very difficult and the film becomes easy to break when forming a film, and thus such a film is not suitable. When the thickness exceeds the upper limit, it becomes necessary, when the resin film is processed into a magnetic recording medium, to apply a larger tension change when performing a dimensional control in the width direction by controlling tape tension of a reproducing device. The lower limit of the thickness is preferably 1.5 μm or more, and more preferably 2 μm or more; and the upper limit of the thickness is preferably 5.5 μm or less and, more preferably 5 μm or less.

In the resin film of the present invention, a value of the product of the Young's modulus in the longitudinal direction and the thickness is 5 GPa·μm or more and 20 GPa·μm or less. When this value is less than the lower limit, handling of the resin film is very difficult and, when this value when this value exceeds the upper limit, it becomes necessary, when the resin film is processed into a magnetic recording medium, to apply a larger tension change when performing a dimensional control in the width direction by controlling tape tension of a reproducing device. The lower limit of the value of the product of the Young's modulus in the longitudinal direction and the thickness is preferably 8 GPa·μm, and more preferably 10 GPa·μm or more; and the upper limit is preferably 18 GPa·μm or less, and more preferably 16 GPa·μm or less.

Furthermore, the resin film of the present invention shows a dimensional change in the film longitudinal direction of −2% or more and +2% or less when the temperature is raised from 30° C. to 110° C. under a load of 2 kg/mm$^2$ applied in the longitudinal direction. When the amount of dimensional change in the longitudinal direction is less than the lower limit, transfer of a projection from the rear surface to the surface of a magnetic layer becomes easy to occur due to winding tightness in a roll state during processing into a magnetic recording medium, and an important property, electromagnetic conversion characteristics, is ill-affected. On the other hand, when the amount of dimensional change exceeds the upper limit, the resin film becomes extensible in the longitudinal direction when a magnetic paint is coated, and causes wrinkles to occur due to a buckling phenomenon. The lower limit of the dimensional change in the film longitudinal direction is preferably −1% or more, more preferably −0.5% or more, and especially preferably 0% or more; and the upper limit is preferably +1.8% or less, more preferably +1.6% or less, and especially preferably +1.4% or less.

As the resin that constitutes the resin film of the present invention, there may be employed one that is itself known, and the resin is not limited particularly as long as it can be formed into a flat film. Specific resins include polyesters, polysulfones, polyamides, polyethers, poyketones, polyacrylics, polycarbonates, polyacetals, polystyrenes, polyamide-imides, polyarylates, polyolefins, polyfluoropolymers, polyurethanes, polyaryl sulfones, polyether sulfones, polyarylene sulfides, polyvinyl chlorides, polyether imides, polytetrafluroethylene, and polyether ketones. These may be copolymers or may be used in a state of mixture. Among these, especially preferable are aromatic polyesters, polyether ketones, polyarylene sulfides, polyolefins, aliphatic polyamides, and semi-aromatic polyamides. Hereinafter, respective resins will further be described.

First, the polyesters in the present invention preferably include polyesters comprising dibasic acids and glycols as constituents. For example, as aromatic dibasic acids, there may be used terephthalic acid, isophthalic acid, phthalic acid, naphthalene dicarboxylic acid, diphenyl sulfone dicarboxylic acid, diphenyl ether dicarboxylic acid, diphenyl ketone dicarboxylic acid, phenylindane dicarboxylic acid, sodium sulfoisophthalate, dibromoterephthalic acid, 4,4'-diphenyl dicarboxylic acid, 6,6'-(ethylenedioxy)di-2-naphthoic acid, and the like. Further, as alicyclic dibasic acids, there may be used oxalic acid, succinic acid, adipic acid, azelaic acid, sebacic acid, dimer acid, and the like. As glycols, there may be used: aliphatic glycols including ethylene glycol, propylene glycol, tetramethylene glycol, hexamethylene glycol, neopentyl glycol, diethylene glycol, and the like; aromatic diols including naphthalene diol, 2,2-bis(4-hydroxydiphenyl)propane, 2,2-bis(4-hydroxyethoxyphenyl)propane, bis(4-hydroxyphenyl) sulfone, hydroquinone, and the like; and alicyclic diols including cyclohexane dimethanol, cyclohexane diol, and the like.

With regard to the intrinsic viscosity (measured in orthochlorophenol at 35° C.) of polyester used in the present invention, from the standpoint of melt-kneadability, film formability, degradability during melt-extrusion, and the like, the lower limit value is preferably 0.55 dl/g, more preferably 0.6 dl/g, and most preferably 0.7 dl/g. When the intrinsic viscosity is less than 0.55 dl/g, melt-kneadability of the polyester with polyether imide deteriorates. Further, the upper limit value is preferably 2 dl/g, more preferably 1.4 dl/g, and most preferably 1.0 dl/g. When the intrinsic viscosity exceeds 2.0 dl/g, the load during extrusion increases and decomposition of the polyester occurs due to shear heat generation, sometimes resulting in formation of coarse projections. Especially when blending other resins mentioned later such as polyether imide, the intrinsic viscosity is preferably not less than the lower limit also from the standpoint of melt-kneadability.

When a polyester film is selected as the resin film of the present invention, it is one of preferable embodiments that the polyester film also contains polyether imide. Polyether imide is a polymer that contains an aliphatic, alicyclic, or aromatic ether unit and a cyclic imide group as repeating units and is not particularly limited as long as it has melt-moldability. For example, there may be mentioned: polyether imides described in U.S. Pat. No. 4,141,927, Japanese Patent No. 2622678, Japanese Patent No. 2606912, Japanese Patent No. 2606914, Japanese Patent No. 2596565, Japanese Patent No. 2596566, and Japanese Patent No. 2598478; and polymers described in Japanese Patent No. 2598536, Japanese Patent No. 2599171, Japanese Patent Laid-Open Publication No. H9-48852, Japanese Patent No. 2565556, Japanese Patent No. 2564636, Japanese Patent No. 2564637, Japanese Patent No. 2563548, Japanese Patent No. 2563547, Japanese Patent No. 2558341, Japanese Patent No. 2558339, and Japanese Patent No. 2834580. To an extent which does not impair the effects of the present invention, the polyether imide may contain, on its main chain, structural units other than cyclic imide and ether units, such as, for example, aromatic, aliphatic, and alicyclic ester units, oxycarbonyl units, and the like.

In the case of a polyester film containing the polyether imide, preferable is a polyether imide having a glass transition temperature of 350° C. or less, and more preferably 250° C. or less; and, from the standpoint of compatibility with polyester, cost, melt-moldability, and the like, most preferable is a condensation product of 2,2-bis[4-(2,3-dicarboxyphenoxy)phenyl]propane dianhydride and m-phenylenediamine or p-phenylenediamine. This polyether imide is one known as "Ultem (registered trademark) 1000 or 5000 Series" produced by SABIC.

The amount of polyether imide, based on the weight of a resin composition of polyester and polyether imide, is preferably 0.5 mass % or more and 10 mass % or less. In the resin film of the present invention, for an effect of inclusion of polyether imide in the polyester film to be exhibited, the amount of polyether imide is preferably not less than the lower limit and, for internal foreign matter generated with polyether imide as nuclei to be suppressed, the amount of polyether imide is preferably not more than the upper limit.

In the case of a polyester film containing the polyether imide, the polyether imide is preferably dispersed in the film with an average dispersion diameter of 1 nm or more and 50 nm or less. When the average dispersion diameter is in this range, variation in strength, dimensional stability, and rate of dimensional change is suppressed, and it becomes possible to obtain a resin film having significantly improved characteristics. When the average dispersion diameter becomes more than 50 nm, binding power of polyimide for polyester molecules decreases and, therefore, the glass transition temperature decreases, thermal dimensional stability deteriorates, variation in the rate of dimensional change tends to increase, and further, an increase in the above-mentioned undulation is caused. The average dispersion diameter is more preferably 20 nm or less in order to obtain better physical properties, and most preferably 10 nm or less in order to control the above amplitude strength (undulation). The lower limit is preferably 1 nm or more.

A method for dispersing polyether imide in polyester with an average dispersion diameter of 1 nm or more and 50 nm or less (or a method for inclusion by compatibilization) is not particularly limited, but a preferable method includes: charging polyester and polyether imide into an extruder; and molding the resin composition with (1) a screw shear rate set to 30 $sec^{-1}$ or more and less than 300 $sec^{-1}$, (2) an extrusion temperature set to 280° C. or more and 320° C. or less, and (3) a discharge time of the polymer set to 30 seconds or more and 10 minutes or less. Regarding above (1), the screw shear rate (=πDN/h, D: screw diameter, N: screw speed, and h: groove depth in screw weighing part) of the extruder is set to more preferably 50 $sec^{-1}$ or more and 250 $sec^{-1}$ or less, and especially preferably 90 $sec^{-1}$ or more and 200 $sec^{-1}$ or less from the standpoint of suppression of thermal decomposition of polyester and compatibilization of polyester and polyether imide. The average dispersion diameter of polyether imide in the film is preferably 3 nm or more and less than 5 nm.

From the standpoint of facilitating fine dispersion of polyether or polyimide, compatibilization, and reduction of coarse dispersoids, it is preferable to use various mixing type screws having a ratio of length to diameter of the screw of 20 or more, and preferably 25 or more. As the mixing type screw, a kneading disk, a rotor type, and the like are suitable. The extruder may be either of single screw type or twin screw kneading type. However, it is effective to use a high shear and low heat generating type screw, and the twin screw type is preferably used. Further, in the present invention, from the standpoint of compatibilization of polyester and polyether imide and suppression of thermal degradation of polyester, it is preferable to set the extrusion temperature to 290° C. or more and 320° C. or less. Furthermore, the discharge time of the polymer is set to more preferably 1.5 minutes or more and 6 minutes or less, and most preferably 2 minutes or more and 5 minutes or less. The discharge time can be suitably changed by altering operating conditions of a feeder and a gear pump, and screw speed of the extruder. The discharge time of the polymer is given by a value V/Q, which is obtained by dividing a total volume V of the extrusion process including extruder, single pipe, filter, and mouthpiece by Q, a throughput of the polymer. The discharge time can be suitably changed by altering operating conditions of the feeder and the gear pump, and the screw speed of the extruder. Also, in the present invention, in order to control amplitude strength (undulation) in the longitudinal direction and the width direction in a wavelength range of 100 μm or more and 1000 μm or less, the amplitude strength being obtained by frequency analysis of surface roughness on side A, it is also effective to optimize natural frequency generated in each step of extrusion process including the above-mentioned extruder, gear pump, single pipe, filter, and mouthpiece. Specifically, the natural frequency in each step is measured and control should be performed so that the frequencies do not overlap among the steps.

Further, in the method of including polyether imide in polyester, a raw material obtained by recovering a biaxially stretched polyester film, which is produced by using a resin composition containing polyether imide compatibilized in polyester, can also be used favorably because it contains polyester in which polyether imide is dispersed without uneven distribution. In this case also, the amount of polyether imide in the recovered raw material is preferably 0.5 mass % or more and 10 mass % or less. Hereat, the recovered raw material is preferably obtained by: obtaining flakes by crushing films by a grinder (crusher); melting the flakes after, when necessary, pressing them together; obtaining a resin (gut) solidified continuously in a thick thread form by discharging the resin from a mouthpiece and cooling after removal of foreign matter through a filter with an aperture of 10 to 50 μm; and cutting the gut by a rotary blade.

Next, as the polyether ketones in the present invention, there may be mentioned those containing structures represented by the following formulas (1) and (2) as constitutional units, and may contain a single monomer unit or monomer units having other structures.

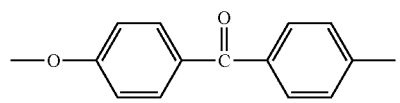

Formula 1

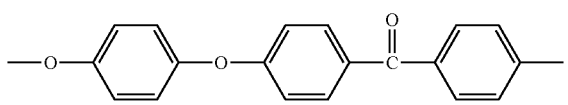

Formula 2

As the monomer units having other structures, the following may be exemplified.

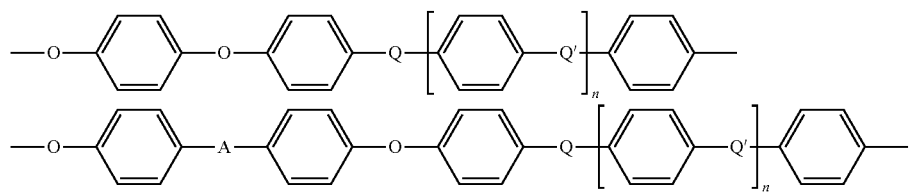

Formula 3

In the above constitutional units, A is a direct bond, oxygen, —CO—, —SO$_2$—, or a bivalent lower aliphatic hydrocarbon group; Q and Q' may be the same or different and is —CO— or —SO$_2$—; and n is 0 or 1. These polymers are described in Japanese Patent Application Publication No. S60-32642, Japanese Patent Application Publication No. S61-10486, Japanese Patent Laid-Open Publication No. S57-137116, and the like.

In the present invention, preferable as the polyether ketone resin is an embodiment including the formula (2) (hereinafter, such an embodiment is referred to as a thermoplastic polyether ether ketone resin). In the case of an embodiment where the thermoplastic resin includes the formula (2), an amount of the unit represented by the formula (2) is, based on the mass of the thermoplastic polyether ketone resin, preferably 60 mass % or more, more preferably 80 mass % or more, and especially preferably 90 mass % or more.

The polyolefin resin in the present invention is not particularly limited and there may be exemplified polyethylene, polypropylene, polycycloolefin, polystyrene, and the like. Among these, from the standpoint that suitable physical properties are obtained and heat resistance can be secured by proper stretching, preferable are polypropylene and polystyrene, especially specific polypropylene and polystyrene mentioned below which has a syndiotactic structure.

The polypropylene in the present invention is preferably one containing not more than 4 mass % of cold xylene soluble part (hereinafter CXS) and having a mesopentad fraction of 0.95 or more. When polypropylene does not satisfy these conditions, there are cases where stability in film formation deteriorates, voids are formed in the film when producing a biaxially oriented film, and lowering of dimensional stability becomes significant.

Here, the cold xylene soluble part (CXS) refers to a polypropylene component dissolved in xylene when the film is completely dissolved in xylene at 135° C. and thereafter precipitated at 20° C., and is thought to correspond to a component which is difficult to crystallize for reasons that the molecular weight is low, and the like. When such a component is contained in the resin in a large amount, there sometimes arise problems that the film is inferior in thermal dimensional stability and the like. Therefore, the amount of CXS is preferably 4 mass % or less, more preferably 3 mass % or less, and especially preferably 2 mass % or less. In order to obtain polypropylene having such an amount of CXS, there may be used a method of enhancing catalytic activity when obtaining the resin, a method of washing the resin obtained with a solvent or propylene monomer itself, and the like.

From a similar standpoint, a mesopentad fraction of the above polypropylene is preferably 0.95 or more, and more preferably 0.97 or more. The mesopentad fraction is an index measured by a nuclear magnetic resonance method (NMR method), and shows stereoregularity in the crystalline phase of polypropylene. The higher the value, the higher the degree of crystallinity, the melting point, and the dielectric breakdown voltage at high temperature, which is preferable. An upper limit of the mesopentad fraction is not particularly specified. In order to obtain a resin having such high stereoregularity, there may be preferably employed: a method of washing resin powder obtained with a solvent such as n-heptane and the like; and a method of suitably performing selection of catalyst and/or cocatalyst and selection of composition.

As such polypropylene, preferable from the standpoint of film formability is one having a melt flow rate (MFR) in the range of 1 to 10 g/10 minutes (230° C., 21.18 N load), and especially 2 to 5 g/10 minutes (230° C., 21.18 N load). In order to obtain a melt flow rate (MFR) value in the above range, there may be employed a method of controlling average molecular weight and molecular weight distribution, and the like.

Such polypropylene comprises mainly a homopolymer of propylene but, to an extent which does not impair the effects of the present invention, it may contain a copolymerization component and the like derived from other unsaturated hydrocarbons, or it may contain a polymer blended, the polymer being not a propylene homopolymer. Monomer components, which constitute such a copolymerization component and a polymer to be blended, include ethylene, propylene (in the case of a copolymer to be blended), 1-butene, 1-pentene, 3-methylpentene-1,3-methylbutene-1, 1-hexene, 4-methylpentene-1,5-ethylhexene-1,1-octene, 1-decene, 1-dodecene, vinylcyclohexene, styrene, allylbenzene, cyclopentene, norbornene, 5-methyl-2-norbornene, and the like. As for amounts to be copolymerized or blended, it is preferable from the standpoint of dielectric breakdown resistance characteristics and dimensional stability that the copolymerization amount is less than 1 mol % and the blending amount is less than 10 mass %.

In addition, to an extent which does not impair the effects of the present invention, such polypropylene may contain various additives such as, for example, nucleating agents, antioxidants, thermal stabilizers, sliding agents, antistatic agents, antiblocking agents, fillers, viscosity modifiers, coloring preventing agents, and the like.

Among these, selection of the kind and addition amount of the antioxidant is important from the standpoint of long-term heat resistance. That is, as such an antioxidant, preferable are phenol-based ones having steric hindrance, among which at least one is preferably a high molecular weight type having a molecular weight of 500 or more. Specific examples thereof include various kinds but, for example, it is preferable to use 1,3,5-trimethyl-2,4,6-tris(3,5-di-t-butyl-4-hydroxylbenzyl)benzene (for example, Irganox (registered trademark) 1330 produced by BASF Japan: molecular weight 775.2), terakis[methylene-3(3,5-di-t-butyl-4-hydroxylphenyl)propionate]methane (for example, Irganox 1010 produced by BASF Japan: molecular weight 1177.7), or the like, together with 2,6-di-t-butyl-p-cresol (BHT: molecular weight 220.4). The total amount of these antioxidants is preferably in the range of 0.03 to 1.0 mass % relative to the total mass of polypropylene. When the amount of the antioxidant is too low, there are cases where long-term heat resistance is inferior. When the amount of the antioxidant is too high, there are cases where blocking under high temperature due to bleed out of these antioxidants has a negative influence when polypropylene is processed into a magnetic recording medium. The amount of the antioxidant is more preferably 0.1 to 0.9 mass %, and especially preferably 0.2 to 0.8 mass %.

When the resin film in the present invention is a polyarylene sulfide film, it is preferably a film containing a polyarylene sulfide resin as a main component. Here, the term "main component" means that it accounts for 60 mass % or more of raw material which constitutes the film.

In the present invention, polyarylene sulfide resin refers to a polymer having a repeating unit of —(Ar—S)—. The Ar includes units represented by the following formula (A) to formula (K), and the like.

Formula 4

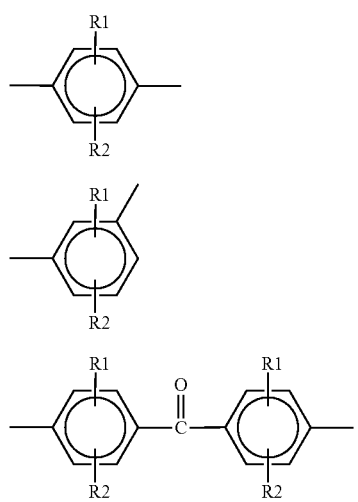

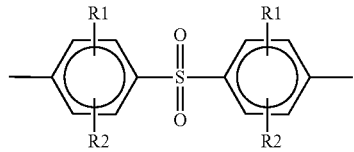

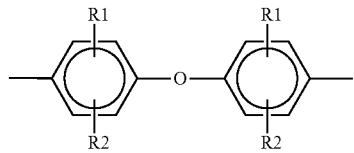

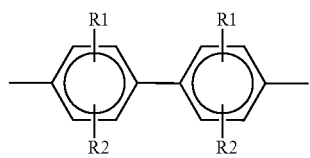

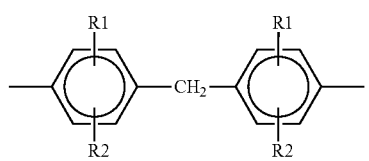

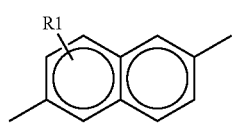

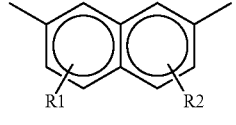

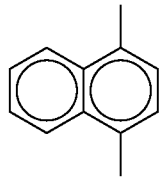

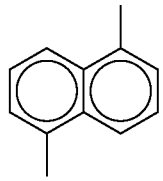

wherein R1 and R2 are substituents selected from hydrogen, alkyl groups, alkoxy groups, and halogen groups; and R1 and R2 may be the same or different.

As the repeating unit, preferable are the p-arylene sulfide units represented by formula (A) above. As representative resins containing these units, there may be mentioned polyphenylene sulfide, polyphenylene sulfide sulfone, polyphenylene sulfide ketone, and the like. From the standpoint of film physical properties and economic efficiency, especially preferable p-arylene sulfide unit is exemplified by p-phenylene sulfide unit.

The polyarylene sulfide resin used in the present invention is preferably constituted of p-phenylene sulfide units as a main constituent unit, represented by the following structural formula, in an amount of 80 mol % or more and 99.9 mol % or less based on the total repeating units. By employing the above composition, excellent heat resistance and chemical resistance can be manifested.

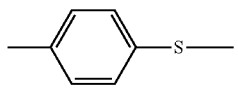

Formula 5

Further, p-phenylene sulfide units can be copolymerized with copolymerization units in an amount in the range of 0.01 mol % to 20 mol % based on the repeating units.
Preferable copolymerization units include:

Formula 6

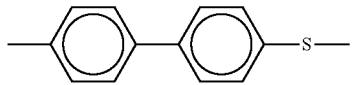

Formula 7

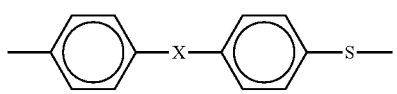

Formula 8

(here, X represents an alkylene, CO, or $SO_2$ unit.)

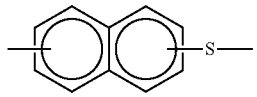

Formula 9

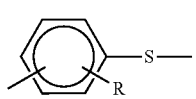

Formula 10

(here, R represents an alkyl, nitro, phenylene, or alkoxy group.)
wherein, especially preferable copolymerization unit is m-phenylene sulfide unit.

The embodiment of copolymerization with a copolymerization component is not particularly limited but is preferably a random copolymer.

The polyarylene sulfide film of the present invention may be any of unstretched film, uniaxially stretched film, and biaxially stretched film but, from the standpoint of ultimately achieving a thin film, preferable is the uniaxially or biaxially stretched film.

When the resin film in the present invention is a polyamide resin film, the polyamide resin includes polymers formed by amide bond formation by a plurality of monomers. As representative thereof, for example, aliphatic polyamides include 6-nylon, 6,6-nylon, 6,10-nylon, 11-nylon, 12-nylon, poly(meta-xylene adipamide), and the like. Further, in addition to these, the polyamide resin may also be a binary or higher copolymer such as 6-nylon/6,6-nylon, 6-nylon/6,10-nylon, 6-nylon/11-nylon, 6-nylon/12-nylon, and the like. Furthermore, there may be preferably used a polyamide resin wherein an aromatic component is contained either in diamine or dicarboxylic acid.

A general formula of aromatic diamine is shown in the following. Compounds which can constitute the aromatic diamine unit represented by the general formula include ortho-xylylenediamine, meta-xylylenediamine, and para-xylylenediamine. These may be used singly by one kind or in combination of two or more kinds.

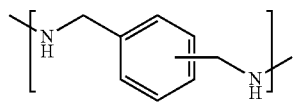

Formula 11

As an example of a dicarboxylic acid unit containing an aromatic component, there may be mentioned phthalic acid, isophthalic acid, terephthalic acid, 2,6-naphthalenedicarboxylic acid, and the like.

Regarding the resin film of the present invention, inert particles may be included in the resin that forms the resin film, in order to optimize projection height and surface roughness on the film layer surface for the purpose of improving handleability when formed into a thin film. The kinds of inert particles preferably include inorganic particles such as spherical silica, aluminum silicate, titanium dioxide, calcium carbonate, and the like; and, besides, organic polymer particles such as cross-linked polystyrene resin particles, cross-linked silicone resin particles, cross-linked acrylic resin particles, cross-linked styrene-acrylic resin particles, cross-linked polyester particles, polyimide particles, melamine resin particles, and the like. There may be used one kind or two or more kinds by selecting from these.

The size of the inert particles is preferably 0.01 µm or more and 1 µm or less, more preferably 0.05 µm or more and 0.7 µm or less, and especially preferably 0.1 µm or more and 0.5 µm or less.

The addition method of inert particles to the resin includes a plurality of methods such as a method of adding the particles to a part of a component that constitutes the resin to obtain slurry and carrying out polymerization as is, and a method of adding the particles after polymerization of the resin by using a twin screw extruder. An amount of addition of the inert particles relative to the total film weight is preferably 0.001% or more and 2% or less, more preferably 0.01% or more and 1% or less, and especially preferably 0.1% or more and 0.8% or less.

As for the layer constitution of the resin film, the film may be constituted of a single layer, or of two or more layers where the degrees of surface roughness of the front surface and the rear surface are different. Especially when the resin film is used as a substrate of a magnetic recording medium, the layer constitution preferably includes two or more layers. When a constitution including two or more layers is employed, there may be cases where the particles are not added to the resin that constitutes the outermost layer.

The resin film of the present invention may be provided with a coating layer for the purpose of improving adhesion with a magnetic layer and improving sliding property of the film itself.

As a method for producing the resin film of the present invention, there may be employed a method which is itself known. For example, the resin film can be produced by: extruding a polymer into a sheet from a die by using a single extruder or extruding a polymer into a sheet from a die after laminating different polymers in a molten state by using two or more extruders: converting the sheet-like material into a monolayer or laminated unstretched resin film; stretching the obtained unstretched resin film preferably in one direction or in orthogonal two directions; and heat-treating the resin film. The temperature in the step of extruding the polymer in a molten state is not particularly limited provided it is a temperature at which there is no unmelted material and thermal degradation of the resin does not proceed excessively, and, for example, extrusion is preferably performed at a temperature between the melting point of the resin (Tm: ° C.) and (Tm+70) ° C. Next, as to the cooling, it is preferable, in order to decrease thickness unevenness while maintaining flatness of the unstretched resin film to be obtained, to use a rotating cooling drum installed beneath the die along the film forming direction and cool the sheet-like material by contact with the drum. When predetermined thickness and Young's modulus are achieved, it is not impossible to leave the unstretched film as is, but, in order for the film to manifest more excellent processability at high temperature, it is preferable to provide the unstretched resin film with a stretching operation to prepare a film having desired thickness and Young's modulus. The stretching technique includes methods such as longitudinal uniaxial stretching, lateral uniaxial stretching, sequential biaxial stretching, simultaneous biaxial stretching, and the like, and is not limited. However, herein, the sequential biaxial stretching will be described. The longitudinal uniaxial stretching is a method corresponding to the sequential biaxial stretching from which lateral stretching is removed, the lateral uniaxial stretching corresponds to the sequential biaxial stretching from which longitudinal stretching is removed, and the simultaneous biaxial stretching corresponds to a biaxial stretching where longitudinal stretching and lateral stretching are performed simultaneously. In the sequential biaxial stretching, it is desirable to stretch the unstretched resin film in an uniaxial direction (usually lengthwise direction) at a temperature between (Tg−10)° C. and (Tg+60)° C., with the glass transition temperature of the resin being denoted by Tg, to a ratio of 2 or more, and preferably 2.5 or more, and then to stretch the resin film in a direction orthogonal to the above stretching direction at a temperature between Tg and (Tg+60) ° C. to a ratio of 2 or more, and preferably 2.5 or more. Further, if necessary, the resin film may be stretched again in the lengthwise direction and/or lateral direction. Furthermore, the resin film after stretching may be heat set at a temperature between (Tm−70)° C. and (Tm−10)° C., with the melting point of the resin being denoted by Tm. The heat set time is preferably 0.1 to 60 seconds.

The resin film of the present invention is used as a base film preferably for a magnetic recording tape, more preferably for a high-density magnetic recording tape, and especially preferably for a digital recording type magnetic recording tape. Accordingly, the magnetic recording tape using the resin film of the present invention will be further described.

The magnetic recording tape of the present invention can be produced by forming a magnetic layer on the abovementioned resin film. In addition, in order to improve adhesion with the magnetic layer and the like, there may be formed, on the surface of the resin film of the present invention, a coating layer and the like having an easy adhesion function, which is itself known, to an extent which does not impair the effects of the present invention.

Now, the copolyester, the polyester film, and the laminated polyester film used in the third embodiment and the fourth embodiment will be further described. In addition, unless otherwise noted, the same as described above also applies to the third embodiment and the fourth embodiment.

The copolyester in the present invention is preferably composed of a dicarboxylic acid component and a glycol component.

First, the dicarboxylic acid component is specifically one containing a phenylene group or a naphthalene-diyl group and includes a terephthalic acid component, an isophthalic acid component, a 2,6-naphthalenedicarboxylic acid component, a 2,7-naphthalenedicarboxylic acid component, and the like. Among these, from the standpoint of the effects of the present invention, preferable are the terephthalic acid component and the 2,6-naphthalenedicarboxylic acid component with which physical properties such as mechanical strength and the like are improved relatively easily, with the 2,6-naphthalenedicarboxylic acid component being especially preferable.

The glycol component includes mainly $C_2$-$C_4$ alkylene glycols, specifically an ethylene glycol component, a trimethylene glycol component, a tetramethylene glycol component, and the like. Among these, from the standpoint of the effects of the present invention, preferable is the ethylene glycol component with which physical properties such as mechanical strength and the like are improved relatively easily.

In the third and fourth embodiments, $C_{31}$-$C_{51}$ dimer components represented by aforementioned formulas (I) and (II), that is, aliphatic dimer acids and dimer diols, are copolymerized. Specific dimer acids and dimer diols preferably contain branched chains and have alicyclic parts such as a cyclohexane ring structure and the like. Especially preferable are those having both branched chains and cyclohexane rings. The number of carbon atoms of preferable dimer components is in the range of 34 to 46.

Further, the copolyester in the third and fourth embodiments may be copolymerized, in a range that does not impair the effects of the present invention, with a copolymerization component which is itself known, for example, an aliphatic dicarboxylic acid component, an alicyclic dicarboxylic acid component, an alkylene glycol component which does not correspond to any of the aforementioned ones, a hydroxycarboxylic acid component, and a trifunctional or more acid component or alcohol component such as trimellitic acid and the like.

The amount of the dimer component is, based on the number of moles of repeating units of the polyester, preferably in the range of 0.3 to less than 5 mol %. When the mole fraction of the dimer component is excessive, film formability deteriorates drastically and there are cases where it becomes difficult to form a film stably. Therefore, the mole fraction of the dimer components is preferably in the range of 0.5 to 4.5 mol %, more preferably in the range of 0.7 to 4.0 mol %, and especially preferably in the range of 0.9 to 3.5 mol %.

By using a copolyester containing a specific amount of copolymerized specific dimer component, there can be produced a molded product, for example, a film and the like, in which both temperature expansion coefficient and humidity expansion coefficient are low. Therefore, the tension control for adjusting the tape width to a constant value becomes easier.

Furthermore, the copolymerization amount of the specific dimer component can be controlled by: adjusting the composition of raw materials so that a desired copolymerization amount is achieved in the polymerization stage; or when using, for example, a dimer diol, by preparing a homopolymer using only the specific dimer diol component or a polymer in which a large amount thereof is copolymerized, and a polymer in which the dimer diol component is not copolymerized or a polymer in which a small amount thereof is copolymerized, and then subjecting these polymers to transesterification by melt kneading so that a desired copolymerization amount is achieved.

In addition, the specific dimer acid component includes "Priplast 1838," "Pripol 1009," and "Pripol 1004," which are dimer acids produced by Croda, and the specific dimer diol component includes "Pripol 2033," a dimer diol produced by Croda, "SOVERMOL 908," a dimer diol produced by Cognis, and the like.

From the standpoint of the effects of the present invention, both dimer acid and dimer diol can be preferably used as a dimer component, but from the standpoint of handling during polymerization and fewness of foreign matter present in the resin, preferable is the dimer diol.

The method for producing the copolyester in the third and fourth embodiments will be described in detail.

The copolyester in the third and fourth embodiments can be obtained by subjecting a polyester precursor to a polycondensation reaction. Specifically, a polyester precursor can be obtained by subjecting: an aromatic dicarboxylic acid component having 6 or more carbon atoms, for example, dimethyl 2,6-naphthalenedicarboxylate; a specific dimer acid or a dimer diol; and ethylene glycol to a transesterification reaction to obtain a polyester precursor. Thereafter, the polyester can be produced by polymerizing the polyester precursor thus obtained in the presence of a polymerization catalyst and, if necessary, solid phase polymerization and the like may be carried out. The intrinsic viscosity of the aromatic polyester thus obtained, as measured by using a mixed solvent of p-chlorophenol/1,1,2,2-tetrachloroethane (weight ratio 40/60) at 35° C. is, from the standpoint of the effects of the present invention, in the range of preferably 0.4 to 1.5 dl/g, more preferably 0.5 to 1.2 dl/g, and especially preferably 0.55 to 0.8 dl/g.

Further, the reaction temperature when producing the polyester precursor is preferably in the range of 190° C. to 250° C., and the reaction is carried out under normal pressure or under increased pressure. When the temperature is lower than 190° C., the reaction does not proceed sufficiently, and when the temperature is higher than 250° C., diethylene glycol and the like, which are byproducts, are likely to be generated.

In addition, in the reaction step of producing the polyester precursor, known esterification or transesterification catalysts may be used. The catalysts include, for example, manganese acetate, zinc acetate, alkali metal compounds, alkaline earth metal compounds, and titanium compounds. Preferable are the titanium compounds, which can suppress high surface projections when the polyester is formed into a film.

Next, the polycondensation reaction in the third and fourth embodiments will be described. First, the polycondensation temperature is in the range of the melting point of the polymer obtained to 230 to 300° C., and more preferably in the range of a temperature higher than the melting point by 5° C. to a temperature higher than the melting point by 30° C. The polycondensation reaction is preferably carried out under reduced pressure of usually 100 Pa or less.

Polycondensation catalysts include metal compounds containing at least one metal element. In addition, the polycondensation catalysts can also be used in an esterification reaction. The metal element includes titanium, germanium, antimony, aluminum, nickel, zinc, tin, cobalt, rhodium, iridium, zirconium, hafnium, lithium, calcium, magnesium, and the like. More preferable metal includes titanium, germanium, antimony, aluminum, tin, and the like. As mentioned previously, especially when titanium compounds are used, high surface projections due to influence of a residual metal used in the catalyst can be suppressed when the polyester is formed into a film. Therefore, it is preferable to use the titanium compounds.

These catalysts may be used singly or in combination. An amount of such catalyst, relative to the number of moles of repeating units of the copolyester, is preferably 0.001 to 0.1 mol %, and more preferably 0.005 to 0.05 mol %.

Specific titanium compounds as the esterification catalyst, the transesterification catalyst, and the polycondensation catalyst include, for example, tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanate, ammonium oxalate titanate, titanium oxide, orthoester or condensed orthoester of titanium, a reaction product comprising an orthoester or condensed orthoester of titanium and hydroxycarboxylic acid, a reaction product comprising an orthoester or condensed orthoester of titanium, hydroxycarboxylic acid, and a phosphorus compound, a reaction product comprising an orthoester or condensed orthoester of titanium and a polyhydric alcohol having at least two hydroxyl groups, 2-hydroxycarboxylic acid, or a base.

Further, the copolyester in the third and fourth embodiments may be prepared, as mentioned previously, by: carrying out polymerization so that a copolyester with desired copolymerization amount is achieved; or, because transesterification proceeds during melt kneading, preparing aromatic polyesters having two or more different copoymerization amounts and blending them by melt kneading so that a desired copolymerization amount is achieved.

In addition, the aforementioned polyester in the third and fourth embodiments may be formed into a composition by blending additives that are themselves known and other resins to an extent which does not impair the effects of the present invention. The additives include stabilizers such as ultraviolet absorbers and the like, antioxidants, plasticizers, lubricants, fire retardants, release agents, pigments, nucleating agents, fillers, glass fiber, carbon fiber, layered silicates, and the like. These may be suitably selected depending on requirements in the application where it is used. Further, the other resins include aliphatic polyester-based resins, polyamide-based resins, polycarbonates, ABS resins, liquid crystal resins, polymethyl methacrylate, polyamide-based elastomers, polyester-based elastomers, polyether imides, polyimides, and the like.

Incidentally, the polyester film in the third and fourth embodiments may further contain, in addition to the aforementioned copolyester, at least one selected from the group consisting of polyimides, polyether imides, polyether ketones, and polyether ether ketones in the range of 0.5 to 25 wt % based on the mass of the resin composition. By having such a resin included in the range above, the glass transition temperature as a polyester resin composition can be increased and, as a result, dimensional stability thereof is easily improved. Among these, preferable are polyether imides because these are easily dispersed more uniformly and these increase the glass transition temperature easily. When the amount is too low, the effect of improving heat resistance is small, and when the amount is too high, phase separation easily occurs. From such a standpoint, the amount is, based on the mass of each film layer, preferably 2 to 20 wt %, more preferably 4 to 18 wt %, and further preferably 5 to 15 wt %. In addition, specific polyether imides include those disclosed in Japanese Patent Laid-Open Publication No. 2000-355631 and the like. Also, from the standpoint of further improving dimensional stability against environmental changes, preferable are polyether imides described in International Publication No. WO/2008/096612, having copolymerized therein a 6,6'-(ethylenedioxy)di-2-naphthoic acid component, a 6,6'-(trimethylenedioxy)di-2-naphthoic acid component, 6,6'-(butylenedioxy)di-2-naphthoic acid component, and the like.

In the case of a polyester film containing the polyether imide, preferable is a polyether imide having a glass transition temperature of 350° C. or less, and more preferably 250° C. or less, and a condensation product of 2,2-bis[4-(2, 3-dicarboxyphenoxy)phenyl]propane dianhydride and m-phenylenediamine or p-phenylenediamine is most preferable from the standpoint of compatibility with polyester, cost, melt-moldability, and the like. This polyether imide is one known as "Ultem (registered trademark) 1000 or 5000 Series" produced by SABIC.

Hereinafter, the polyester film and laminated polyester film in the third and fourth embodiments will be described in detail. However, unless otherwise noted, the same as described in the first and second embodiments also applies thereto. In addition, in the fourth embodiment, the term, polyester film, sometimes means a laminated polyester film.

In the third and fourth embodiments, the higher the value of tan δ peak temperature, obtained by measurement with a dynamic viscoelasticity measuring apparatus (DMA) to be mentioned later, the more preferable, and the tan δ peak temperature is 100° C. or more. The higher the tan δ peak temperature, the more difficult the film becomes to be stretched in the longitudinal direction during a coating step of a magnetic layer and the like, and the more difficult troubles such as breakage of the film, coating unevenness, and the like become to occur. The lower limit of the tan δ peak temperature is preferably 115° C. or more, more preferably 120° C. or more, and especially preferably 125° C. or more. In addition, as mentioned previously, the higher the value of tan δ peak temperature, the better. And thus, the upper limit thereof is not particularly restricted.

Furthermore, the polyester film in the third and fourth embodiments has, from the standpoint of manifesting excellent dimensional stability, the temperature expansion coefficient ($\alpha t$) in the film width direction is in the range of preferably −8.0 to 10 ppm/° C., more preferably −7.5 to 9 ppm/° C., and especially preferably −7.0 to 8 ppm/° C.

In addition, the polyester film in the third and fourth embodiments has, from the standpoint of manifesting excellent dimensional stability, the humidity expansion coefficient ($\alpha h$) in the film width direction in the range of preferably 1 to 8.5 ppm/% RH, more preferably 3 to 8.5 ppm/% RH, and especially preferably 4 to 7 ppm/% RH. If the humidity expansion coefficient falls out of these ranges, dimensional change in response to humidity change becomes large. Such temperature expansion coefficient and humidity expansion coefficient can be adjusted by the aforementioned blending or copolymer composition and stretching mentioned below.

The polyester film in the third and fourth embodiments is, as mentioned previously, preferably an oriented polyester film, especially one stretched in the film forming direction and the width direction and having molecular orientation improved in respective directions. Such a polyester film is preferably produced, for example, by the following method, because the method easily provides the film with physical properties including arbitrary Young's modulus, temperature expansion coefficient, humidity expansion coefficient, and the like while maintaining film formability.

First, the above-mentioned polyester composition of the present invention is used as a raw material, which is dried and, thereafter, supplied to an extruder heated to a temperature between the melting point (Tm: ° C.) and (Tm+50) ° C., and extruded into a sheet from a die, for example, a T-die or the like. This extruded sheet-like material is solidified by rapid cooling by a cooling drum under rotation and the like into an unstretched film, and further the unstretched film is biaxially stretched. Further, in the fourth embodiment, the above copolyester is used as a raw material of at least one layer, two or more molten polyesters are laminated in the die and thereafter extruded into a film, where preferably polyesters are extruded respectively at a temperature between the melting point (Tm: ° C.) and (Tm+70) ° C., or two or more molten polyesters are extruded from the die and thereafter laminated, the sheet-like material is solidified by rapid cooling by a cooling drum and the like into an unstretched film, and further the unstretched film is biaxially stretched.

In addition, in order to achieve at, ah, and Young's modulus specified in the third and fourth embodiments, it is necessary to make subsequent stretching proceed easily, while the polyester composition in the third and fourth embodiments tends to crystallize rapidly. From such a standpoint, cooling by the cooling drum is preferably performed very rapidly. From such a standpoint, cooling is preferably carried out at a low temperature of 20 to 60° C. By performing cooling at such a low temperature, crystallization in a state of unstretched film is suppressed, and it becomes possible to perform subsequent stretching more smoothly.

As biaxial stretching, a method that is itself known can be employed, and it may be either sequential biaxial stretching or simultaneous biaxial stretching.

Herein, a production method by the sequential biaxial stretching will be described as an example, where longitudinal stretching, lateral stretching, and a heat treatment are performed in this order. First, preferably, the unstretched film is, in the initial longitudinal stretching, stretched at a temperature between (Tg: ° C.) and (Tg+40)° C. to a ratio of 3 to 8, subsequently stretched in the lateral direction at a temperature higher than the one employed in the preceding longitudinal stretching between (Tg+10) and (Tg+50)° C. to a ratio of 3 to 8, and, as a heat treatment, subjected to a heat setting treatment at a temperature not more than the melting point of the copolyester and between (Tg+50) and (Tg+150)° C. for 1 to 20 seconds and more preferably for 1 to 15 seconds.

In the above description, sequential biaxial stretching was described. However, the polyester film in the third and fourth embodiments can also be produced by simultaneous biaxial stretching, where longitudinal stretching and lateral stretching are performed simultaneously and, for example, the stretching ratio and stretching temperature described above should be used as reference.

Further, in the fourth embodiment, the mole fraction of the dimer acid and the dimer diol is preferably 4.5 mol % or less, more preferably 4.0 mol % or less, and especially preferably 3.5 mol % or less.

In addition, the polyester film of the present invention is not limited to a single layer film but may be a laminated film. In the case of a laminated film, two or more molten polyesters are laminated in the die and thereafter extruded into a film, where preferably polyesters are extruded respectively at a temperature between the melting point (Tm: ° C.) and (Tm+70)° C., or two or more molten polyesters are extruded from the die and thereafter laminated, the sheet-like material is solidified by rapid cooling into a laminated unstretched film, and subsequently biaxial stretching and heat treatment should be performed by methods similar to those in the case of the aforementioned single layer film. Also, when a coating layer is disposed on the surface layer of the polyester film, it is preferable that a desired coating liquid is applied on one surface or both surfaces of the unstretched film or the uniaxially stretched film, and subsequently biaxial stretching and heat treatment are performed by a method similar to those in the case of the aforementioned single layer film.

Incidentally, in the fourth embodiment, the polyester film is, as mentioned later, one formed by laminating at least two or more layers with different surface roughness, one layer of which should be formed of a copolyester in which the aforementioned dimer component is copolymerized. The proportion of the dimer component in each film layer is not particularly limited as long as it does not exceed the aforementioned upper limit amount, but it is preferable that a difference in mole fractions of the dimer component in each layer is as small as possible. When a difference in mole fractions of the dimer component in two layers is too large, curling of the film is caused and defects are generated in the coating step of a magnetic layer or the like. From such a standpoint, the difference in mole fractions is preferably 3 mol % or less, more preferably 2.5 mol % or less, and especially preferably 2.0 mol % or less.

On the other hand, by performing lamination, the film sometimes curls in an undesirable direction depending on the difference in molecular weights of the resins, film forming conditions, and the like. In such a case, a difference in mole fractions of the dimer component in each layer may be generated intentionally. From such a standpoint, the lower limit of the difference in the mole fractions is preferably 0 mol % or more, more preferably 0.05 mol % or more, further preferably 0.10 mol % or more, and especially preferably 0.15 mol % or more.

As the laminated polyester film of the fourth embodiment, preferable is a laminated polyester film in which the surface and rear surfaces have different surface roughness, in order for the film to satisfy both of electromagnetic conversion characteristics and web handleability. In general, a magnetic layer is coated on a flat surface and a backcoat layer is coated on a rough surface. An average surface roughness Ra of the flat surface is preferably 0.7 to 3.8 nm, more preferably 0.9 to 3.6 nm, and especially preferably 1.1 to 3.4 nm. Further, an average surface roughness of the rough surface is preferably in the range of 4.0 to 8.0 nm, more preferably 4.3 to 7.5 nm, further preferably 4.6 to 7.0 nm, and especially preferably 4.8 to 6.5 nm.

According to the present invention, a magnetic recording tape for data storage and the like can be produced by using the resin film, polyester film, and laminated polyester film of the present invention as the base film, forming a nonmagnetic layer and a magnetic layer in this order on one surface thereof, forming a backcoat layer of the other surface, and the like.

Incidentally, the resin film, polyester film, and laminated polyester film of the present invention are, as mentioned previously, not limited to a single layer film but may be a laminated film, thereby making it easy to satisfy both of flatness and windability. For example, by coating a magnetic layer on a flat surface having a small surface roughness and a backcoat layer on a rough surface having a large surface roughness, both of the required flatness and conveyability can be satisfied to a higher degree. Hereat, the kinds of inert particles added to the resin preferably include inorganic particles such as spherical silica, aluminum silicate, titanium dioxide, calcium carbonate, and the like; and, besides, organic polymer particles such as cross-linked polystyrene resin particles, cross-linked silicone resin particles, cross-linked acrylic resin particles, cross-linked styrene-acrylic resin particles, cross-linked polyester particles, polyimide particles, melamine resin particles, and the like. There may be used one kind or two or more kinds by selecting from these.

The size of the inert particles is preferably 0.01 µm or more and 1 µm or less, more preferably 0.05 µm or more and 0.7 µm or less, and especially preferably 0.1 µm or more and 0.5 µm or less.

The addition method of inert particles to the resin includes a plurality of methods including: a method of adding the particles to a part of a component which constitutes the resin to obtain a slurry and carrying out polymerization as is; and a method of adding the particles after polymerization of the resin by using a twin screw extruder. An amount of addition of the inert particles relative to the total film weight is preferably 0.001% or more and 2% or less, more preferably 0.01% or more and 1% or less, and especially preferably 0.1% or more and 0.8% or less.

The magnetic recording tape of the present invention can be produced by forming a magnetic layer on the above-mentioned resin film, polyester film, and laminated polyester film. In addition, in order to improve adhesion with the magnetic layer and the like, on the resin film of the present invention, there may be formed a coating layer and the like having an easy adhesion function, which is itself known, to an extent which does not impair the effects of the present invention.

The magnetic layer that constitutes the magnetic recording tape in the present invention is not particularly limited. However, it is formed by uniformly dispersing iron, needle-like fine magnetic powder containing iron as a main component, or barium ferrite in a binder such as polyvinyl chloride, vinyl chloride/vinyl acetate copolymer, and the like, and applying a coating liquid obtained. As mentioned previously, by using the resin film, a polyester film, and a laminated polyester film of the present invention, there can be produced a magnetic recording tape having more excellent dimensional stability, electromagnetic conversion characteristics, and error rate performance.

Incidentally, as mentioned previously, it is necessary to micronize magnetic materials in order to increase recording density. Thus, it has become difficult to remove the solvent and the like from the coating liquid and, in order to maintain processability, it has become necessary to perform drying and the like at a higher temperature. And, the present inventors have found anew that, when processing of a film having extremely flat surface is tried at high temperature, problems such as wrinkles arise, and have reached the present invention.

Further, it is preferable to coat a magnetic layer so that its thickness becomes 1 µm or less, and more preferably 0.1 to 1 µm, from the standpoint of producing a coating type magnetic recording tape for high density recording, the tape being especially excellent in output in a short-wavelength region and electromagnetic conversion characteristics such as S/N, C/N, and the like, and having both small dropout and error rate. Also, if necessary, it is also preferable to disperse a nonmagnetic layer containing fine titanium oxide powder and the like in an organic binder similar to that in the magnetic layer, and coat the dispersion as an underlayer of a coating type magnetic layer.

Furthermore, on the surface of the magnetic layer, depending on the purpose, application, and necessity, there may be provided sequentially a protective layer such as diamond-like carbon (DLC) and the like, and a fluorine-containing carboxylic acid-based lubricating layer; and on the other surface, there may be provided a known backcoat layer.

The coating type magnetic recording tape thus obtained is extremely useful as a magnetic tape for data applications such as LTO, enterprise, and the like. Especially, according to the present invention, precise tracking becomes possible by control of tape tension and, thus, it becomes possible to increase track density in a linear tape dramatically.

EXAMPLES

The present invention will be described more specifically using the following Examples and Comparative Examples.

The characteristics in the present invention were measured and evaluated by the following methods.

(1) Young's Modulus

A sample having width of 10 mm and length of 15 cm is cut out from a sheet of film obtained, and drawn using a universal tensile test device (manufactured by Toyo Baldwin Co., Ltd., product name: Tensilon) under the conditions of 100 mm distance between chucks, 10 mm/min in tensile speed, and 500 mm/min in chart speed. The Young's modulus is calculated from the tangent of the rising part of the load-elongation curve obtained.

(2) Film Thickness

Ten sheets of film are stacked while avoiding trash, the thickness of the stack is measured using a point type electronic micrometer, and film thickness per sheet is calculated.

A thickness of each film was measured as follows. In the case of unstretched film, a cross-section of the film in the direction perpendicular to the film forming direction is cut out with a microtome (ULTRACUT-S), the thickness of each layers and a thickness ratio to the total thickness of each layer were calculated using an optical microscope. The thickness of each layer was calculated by multiplying the thickness ratio of the each film by the thickness of the film obtained above in (2).

In the case of stretched film, the film was cut out in the similar way as above, and the thickness of each layer was calculated using a transmission electron microscope.

(3) Film Elongation Under High Temperature and High Tension

A sample having a dimension of 30 mm in the longitudinal direction and 4 mm in the width direction is cut out from the film, and set in a thermomechanical analyzer EXSTR-6000 manufactured by Seiko Instruments Co. such that the distance between chucks is 20 mm. The sample is heated from 30° C. to 170° C. at a temperature rise rate of 5° C./min under the loading condition of 2 kg/mm$^2$ in the longitudinal direction, and elongation (%) is calculated from length (L1) at 30° C. and length (L2) at 110° C. of the sample in the longitudinal direction according to the following formula.

Elongation at 110° C.(%)=(L2−L1)/L1×100

(4) Dynamic Viscoelasticity

A sample cut to a dimension of 30 mm in longitudinal direction and 5 mm in width direction is set in a viscoelasticity measuring apparatus DMA-8000 manufactured by ParkinElmer Inc. under the conditions of 11 mm distance between chucks and 0.1 mm amplitude, and heated from 30° C. to a temperature that is 20° C. below the melting point of the material at a temperature rise rate of 2° C./min.

A temperature of the peak of tan δ at the frequency of 1 Hz is determined.

(5) Temperature Expansion Coefficient (αt)

A sample having a dimension of length of 15 mm and width of 5 mm is cut out from a sheet of film obtained so that a film forming direction and a width direction are each aligned with measuring directions, and the sample is set in a TMA3000 manufactured by SHINKU-RIKO Inc., preprocessed at 60° C. for 30 minutes under nitrogen atmosphere (0% RH), and cooled to room temperature. Subsequently the sample is heated from 25° C. to 70° C. at the rate of 2° C./min, the sample length is measured at each temperature, and (at) is calculated according to the following formula. Besides, the measuring direction is in line with the longitudinal direction of the cut-out sample, and the sample length is measured five times and the mean value is used.

$\alpha t=\{(L60-L40)/(L40\times\Delta_T)\}+0.5$, wherein L40 is a sample length (mm) at 40° C. and L60 is a sample length (mm) at 60° C., ΔT is 20 (=60−40)° C., 0.5 is a temperature expansion coefficient (×10$^{-6}$/° C.) of silica glass.

(6) Humidity Expansion Coefficient (αh)

A sample having at a dimension of length of 15 mm and width of 5 mm is cut out from a sheet of film obtained so that a film forming direction and a width direction are each aligned with measuring directions, and the sample is set in a TMA3000 manufactured by SHINKU-RIKO Inc., the sample length is measured at each humidity of 30% RH and 70% RH under nitrogen atmosphere at 30° C., and the humidity expansion coefficient is calculated according to the following formula.

Besides, the measuring direction is in line with the longitudinal direction of the cut-out sample, and the sample length is measured five times and the mean value is used as ah.

$\alpha h=(L70-L30)/(L30\times\Delta H)$, wherein L30 is the sample length (mm) at 30% RH, L70 is the sample length (mm) at 70% RH, and ΔH is 40 (=70−30)% RH.

(7) Determination of Dimer Components (Dimer Acid, Dimer Diol)

A sample (20 mg) is dissolved in a mixed solvent (0.6 mL) of deuterated trifluoroacetic acid: deuterated chloroform=1:1 (volume ratio) at room temperature, and the amounts of dimer acid and dimerdiol in a polymer chip and film are calculated by $^1$H-NMR at 500 MHz.

(8) Intrinsic Viscosity (IV)

The intrinsic viscosity of a polyester and film obtained is determined at 35° C. by dissolving the polymer using a mixed solvent of p-chlorophenol/tetrachloroethane (40/60 weight ratio).

(9) Glass Transition Temperature (Tg) and Melting Point (Tm)

The glass transition temperature (extrapolated onset temperature) and the melting point are measured using a sample of 10 mg at temperature rise rate of 20° C./min by a DSC (manufactured by TA Instruments Co., Ltd., product name: Thermal Analyst2100).

(10) Measurement of Weight-Average Molecular Weight (Mw) and Molecular Weight Distribution (Mw/Mn) of Polypropylene The measurement was carried out using GPC (gel permeation chromatography) under the following conditions.

Measuring instrument: High temperature GPC incorporating a differential refractometer (RI), HLC-8121GPC/HT type, manufacture by Tosoh Co., Ltd.

Column: TSKgel GMHhr-H(20)HT, manufactured by Tosoh Co., Ltd., three columns connected Column temperature: 145° C.

Eluent: trichlorobenzene

Flow rate: 1.0 mL/min

A calibration curve was obtained by measuring using a standard polystyrene manufactured by Tosoh Co., Ltd and converting the result to a value for polypropylene.

(11) Stereoregularity Distribution Measurement of the Polypropylene by Successive Extraction Method Polypropylene resin was fully dissolved in xylene (1) under reflux and then the mixture was left standing for 4 hours at room temperature. The xylene insoluble part was filtered and provided to the next extraction. The filtrate was evaporated to dryness, and the remaining mass was weighed. The resulting mass was regarded as the amount of atactic component. The xylene insoluble part was subjected to successive Soxhlet extractions for each 6 hours in the order of n-pentane (2), n-hexane (3), and n-heptane (4) using a Soxhlet fat extraction apparatus. The last extraction residue, still insoluble in n-heptane, was weighed, and the resulting mass was regarded as the amount of isotactic component. The each amount was expressed in the percentage of the resin mass before being dissolved in xylene.

(12) Manufacturing Magnetic Recording Tape

A film slit in 1 m width is conveyed with tension of 2 kg/mm$^2$, and magnetic paint and nonmagnetic paint are applied to one surface of the film base according to the following description, and the film is slit in 12.65 mm width, from which a pancake is made. A length of 200 m was then incorporated in a cassette from the pancake to make a magnetic tape.

("Part" in the following list refers to "mass part".)

| Coating liquid for forming magnetic layer | |
|---|---|
| Barium ferrite magnetic powder (plate diameter: 20.5 nm, plate thickness: 7.6 nm, aspect ratio: 2.7, Hc: 191 kA/m (≈2400 Oe), saturation magnetization: 44 Am$^2$/kg, BET specific surface area: 60 m$^2$/g) | 100 parts |
| Polyurethane resin Mass average molecular weight 10,000 Sulfonic acid functional group 0.5 meq/g | 12 parts |
| α-alumina HIT60 (manufactured by SUMITOMO CHEMICAL Co., Ltd.) | 8 parts |
| Carbon black # 55 (manufactured by Asahi Carbon Corporation) Particle size 0.015 μm | 0.5 parts |
| Stearic acid | 0.5 parts |
| Butyl stearate | 2 parts |
| Methyl ethyl ketone | 180 parts |
| Cyclohexanone | 100 parts |
| Coating liquid for forming nonmagnetic layer | |
| Nonmagnetic powder α-iron oxide Mean length of long axis: 0.09 μm, BET specific surface area: 50 m$^2$/g pH 7 DBP oil absorption 27-38 ml/100 g Surface treatment layer Al$_2$O$_3$ 8 mass % | 85 parts |
| Carbon black "Conductex" (registered trademark), SC-U (manufactured by Clumbia carbon company) | 15 parts |
| Polyurethane resin UR8200 (manufactured by Toyobo Corporation) | 22 parts |
| Phenylphosphonic acid | 3 parts |
| Cyclohexanone | 140 parts |
| Butyl stearate | 1 parts |
| Stearic acid | 2 parts |
| Methyl ethyl ketone | 375 parts |
| Cyclohexanone | 135 parts |

Components of the above-mentioned coating liquids (coating liquid for forming magnetic layer and coating liquid for forming nonmagnetic layer), respectively, were kneaded in a kneader. To a horizontal sand mill filled with zirconia beads having 1.0 mm φ to 65 v/v % of the dispersion volume, a coating liquid was supplied using a pump and the beads were dispersed at 2,000 rpm for 120 min (substantially the period in which the liquid remained in the dispersion volume). The coating liquids for forming nonmagnetic layer and for forming magnetic layer were prepared respectively by adding polyisocyanate to the dispersion at an amount of 5.0 parts for the coating liquid for nonmagnetic layer and 2.5 parts for the coating liquid for magnetic layer and then 3 parts of methylethyl ketone, and filtering the resulting dispersion using the filter with an average aperture of 1 μm.

The coating liquid obtained for forming a nonmagnetic layer was coated and dried on the film so that the thickness of the layer after drying became 0.8 μm, and then the coating liquid for forming magnetic layer was coated so that the thickness of the magnetic layer after drying became 0.07 μm, and the magnetic layer was oriented by a cobalt magnet with a magnetic force of 6,000 G (600 mT) and a solenoid with a magnetic force of 6,000 G (600 mT) while the layer is wet, and was dried. The film was then coated with a back coat layer (carbon black (mean particle size: 17 nm, 100 parts), calcium carbonate (mean particle size: 40 nm, 80 parts), and α-alumina (mean particle size: 200 nm, 5 parts) are dispersed in polyurethane resin and polyisocyanate) so that the thickness after calendering became 0.5 μm. The film was calendered at a temperature of 90° C. and a linear pressure of 300 kg/cm (294 kN/m) with a calender apparatus, and subjected to curing at 70° C. for 48 hours. Furthermore, to an apparatus equipped with a slit-product feeder and winder, nonwoven fabric and a razor blade were attached in such a way that both of them were pressed on the magnetic surface, and a magnetic tape was obtained by cleaning the surface of the magnetic layer using a tape cleaning device.

(13) Processability

In the step of coating and drying magnetic paint in the above paragraph of (12) Manufacturing magnetic recording tape, processability was determined by the following criteria while observing the condition of the web after drying.

Excellent: 0 wrinkle/i m width after drying

Good: 1 wrinkle/1 m width after drying

Poor: 2 or more wrinkles/I m width after drying

(14) Dimensional Change in the Width Direction of Magnetic Recording Tape when Tension is Applied A magnetic tape (30 cm length) slit in the width of 12.6 5 mm (½ inch), prepared in above (12), is set as shown in FIG. 1 under an atmosphere of temperature of 23° C. and humidity of 50%.

Under this condition, while a weight of 0.2 N is attached to one end of the magnetic tape (and the other end is fixed), the width (T1) of the magnetic tape is measured with a laser outer diameter measuring instrument (LS-9030N) manufactured by KEYENCE.

Then the weight is changed to a weight of 1.2 N, and the width (T2) of the magnetic tape is measured with a laser outer diameter measuring instrument (LS-9030N) manufactured by KEYENCE.

The change in width dimension per 1 N was calculated according to the following formula.

Change in width dimension (ppm)=(T1−T2)/T1×1,000,000

In addition, the measurement was repeated three times, and a mean value was determined as the dimensional change in the width direction per 1 N.

(15) Easiness of Controlling Tension

In a similar method as above-mentioned (14), the load of a weight of 0.55 N was applied to the longitudinal direction of the magnetic tape. Dimensional change in the width direction of the ½ inch magnetic tape caused by a change of the following storage environmental conditions was measured, and the load was adjusted (increased or decreased) so that the dimensional change in the width direction became 0. The sum of weight changes each necessary in the environment change A and the environment change B was calculated, and easiness of controlling tension of the tape was evaluated. A tape with smaller weight change is regarded as having easiness of controlling tension.

Environment change A: temperature=15° C., humidity=15% RH→temperature=25° C., humidity=75% RH
Environment change B: temperature=15° C., humidity=75% RH→temperature=40° C., humidity=15% RH

(16) Electromagnetic Conversion Characteristics

A ½ inch linear system with a head fixed was used for electromagnetic conversion characteristics measurement. An electromagnetic induction type head (track width: 25 μm, gap: 0.1 μm) was used for recording and an MR head (8 μm) for reproducing. Relative velocity between head and tape was set to 10 m/s, and a signal of recording wavelength of 0.2 μm was recorded, and the reproduced signal was subjected to frequency analysis using a spectrum analyzer. C/N ratio was determined as a ratio of output C of the carrier signal (wavelength 0.2 μm) to integrated noise N over the whole region of the spectrum, and the relative value was calculated by setting the value of the sample prepared in Comparative Example 2 by a method of the above-mentioned (11) for reference as 0 dB, and the result was evaluated according to the following criteria.

Excellent: +1 dB or more
Good: −1 dB or more, less than +1 dB
Poor: less than −1 dB

(17) Error Rate

A web of tape prepared in the above-mentioned (12) was slit in the width of 12.65 mm (½ inch) and incorporated in a case for LTO, and a data storage cartridge with the length of magnetic recording tape of 850 m was assembled. The data storage was recorded using LTO5 drive manufactured by IBM Corporation under the environment of 23° C., 50% RH (recording wavelength 0.55 μm), and then the cartridge was stored under the environment 50° C., 80% RH for 7 days. After storing the cartridge at normal temperature for one day, and an error rate of the signal reproduced over the whole length was measured. The error rate is calculated from the error information (the number of error bits) output by the drive according to the following formula. Dimensional stability is evaluated according to the following criteria.

Error rate=(the number of error bits)/(the number of recorded bits)

Excellent: An error rate is less than $1.0 \times 10^{-6}$.
Good: An error rate is $1.0 \times 10^{-6}$ or more less than $1.0 \times 10^{-4}$
Poor: An error rate is $1.0 \times 10^{-4}$ or more.

(18) Dropout

The data storage cartridge, used in the above-mentioned (17) to measure the error rate, was set in LTO5 drive manufactured by IBM Corporation, and a data signal of 14 GB was recorded to the storage, and then reproduced. A missing pulse was detected as a (pulse) signal with an amplitude (P-P value) not exceeding 50% of the mean signal amplitude, and a dropout as a continuous missing pulses of 4 or more. In addition, the dropout is evaluated over a whole length of one roll of tape (850 m), converted to the number per 1 m, and judged according to the following criteria.

Excellent: Dropouts is less than 3/m
Good: Dropout is 3/min or more and less than 9/min
Poor: Dropout is 9/min or more

(19) Surface Roughness (Ra)

The surface of the tape was measured under the conditions of a measurement magnification of 25 times and a measurement area of 283 μm×213 μm (=0.0603 mm²) using a non-contact 3D surface profiler (manufactured by ZYGO company: NewView5022), and a central surface average roughness (Ra) was demanded by surface analysis software MetroPro incorporated in the profiler, which was used as the surface roughness (Ra). In addition, the measurement was carried out ten times by changing the measurement spot and the central surface average roughness (Ra) was determined by averaging these measured values.

An example of the first embodiment is explained taking examples of Examples 1-14 and Comparative Example 1-5, but the present invention is not limited by these examples.

Example 1

PEN resin composition 1, which contained 0.1 wt % of cross-linked polystyrene particles having a mean particle size of 0.2 μm and has intrinsic viscosity (ortho-chlorophenol, 35° C.) of 0.60 dl/g, was dried at 180° C. for 5 hours in the form of chip, supplied to the hopper of an extruder, melted at 300° C. in the extruder, and extruded from a T die onto the surface of a casting drum which had a surface finish of 0.3 S and a surface temperature of 60° C., and quenched and solidified to obtain an unstretched film.

The resulting unstretched film was preheated at 120° C., stretched 4 times between a low speed roll and a high-speed roll by heating with an infrared heater with a surface temperature of 830° C. located 14 mm above the film, quenched, then supplied to a stenter, and stretched laterally 4.6 times at 150° C., and to further laterally 1.25 times at 160° C., and was heat set at 205° C. for 3 seconds to obtain a film having a thickness of 3.0 m. The Young's modulus of the film obtained was 6 GPa in the lengthwise direction and 11 GPa in the lateral direction. The characteristics of the film and magnetic tape obtained are shown in Table 1.

Examples 2 and 3

A biaxiall stretched film was obtained using PEN resin composition 1 of Example 1 in the similar manner as in Example 1 except that the stretching ratio and the thickness were changed as described in Table 1. The characteristics of the film and magnetic tape obtained are shown in Table 1.

Example 4

Dimethyl 2,6-naphthalenedicarboxylate (95 parts), dimethyl isophthalate (4 parts) (5 mol % based on the total amount of all dicarboxylate components) and ethyleneglycol (60 parts) were subjected to transesterification using manganese acetate tetrahydrate (0.03 parts) as a transesterification catalyst and adding silica particles having a mean particle size of 0.3 µm (0.1 wt %) as a lubricant in accordance to normal procedure in the art, and trimethyl phosphate (0.023 parts) was added to the reaction mixture to terminate the transesterification substantially.

Then, antimonous oxide (0.024 parts) was added to the mixture, and the mixture was polymerized in accordance to normal procedure in the art, under high temperature and high vacuum to obtain PEN resin composition 2, which had intrinsic viscosity (ortho-chlorophenol, 35° C.) of 0.61 dl/g and is a polyethylene-2,6-naphthalate copolymer (DEG copolymerization amount 1.1 mol %) containing silica particles. The copolymer obtained was, in the similar manner as in Examples 1, dried, extruded to obtain an unstretched film, and then the resulting unstretched film was preheated at 110° C., stretched 4.3 times between a low speed roll and a high-speed roll by heating with an infrared heater with a surface temperature of 800° C. located 14 mm above the film, quenched, then supplied to a stenter, and stretched laterally 6 times at 150° C., and was heat set at 200° C. for 3 seconds to obtain a film having a thickness of 2.5 µm. The characteristics of the film and magnetic tape obtained are shown in Table 1.

Example 5

An unstretched film was obtained using PEN resin composition 1 of Example 1 in the similar manner as in Example 1, and not stretched longitudinally, provided to a stenter, preheated at 160° C., and stretched 5 times at 150° C. to obtain a film having a thickness of 3.5 m. The characteristics of the film and magnetic tape obtained are shown in Table 1.

Preparation of PET-Based Source Material (1-a) Preparation of PET pellet: Dimethyl terephthalate (194 mass parts) and ethyleneglycol (124 mass parts) were loaded in a transesterification reactor, and the contents were heated to 140° C. and melted. Magnesium acetate tetrahydrate (0.3 mass parts) and antimonous oxide (0.05 mass parts) were added to the contents under stirring, and then transesterification was performed at 140-230° C. while methanol was distilled. Subsequently, a solution containing 5 mass % trimethylphosphate in ethylene glycol (0.5 mass parts) (0.025 mass parts as trimethylphosphate) and a solution containing 5 mass % sodium dihydrogen phosphate dihydrate in ethylene glycol (0.3 mass parts) (0.015 mass parts as sodium dihydrogen phosphate dihydrate) were added to the contents.

Addition of an ethylene glycol solution of trimethylphosphate lowers the temperature of reaction contents. Thus, the reaction contents were kept being stirred while excess ethylene glycol was distilled until the temperature returned to 230° C. After the temperature of the reaction contents in the transesterification reactor reached 230° C., the reaction contents was transferred to a polymerization reactor.

After transferred to the polymerization reactor, in the reaction system, the pressure was lowered to 0.1 kPa while the temperature was gradually raised from 230° C. to 275° C. The times to arrive at a final temperature and a final pressure were both set at 60 minutes. When the contents were reacted for 2 hours (3 hours from the start of polymerization) after arriving at the final temperature and the final pressure, the stirring torque of the polymerization reactor read a predetermined value (though the specific value varied depending on the specification of polymerization reactor, for this polymerization reactor, the value corresponding to the polyethylene terephthalate with intrinsic viscosity of 0.55 was used as the predetermined value). The reaction system was then purged using nitrogen to normal pressure to terminate the polycondensation reaction, and the reaction contents were discharged into cold water in the form of a strand, and cut immediately to obtain PET pellets of polyethylene terephthalate with intrinsic viscosity (ortho-chlorophenol, 35° C.) of 0.55 dl/g (source material-1a).

The above-mentioned PET pellets (source material-1a) was heat-treated for an extended period of time at a temperature of 230° C. under reduced pressure of 0.1 kPa using a rotary type vacuum polymerization reactor, and solid-phase polymerization was continued until intrinsic viscosity (ortho-chlorophenol, 35° C.) of 0.70 dl/g was achieved (source material-1ak).

(1-b) Preparation of copolymerised PET pellet: Dimethyl terephthalate (180 mass parts), dimethyl isophthalate (20 mass parts) and ethyleneglycol (129 mass parts) were loaded in a transesterification reactor, and the contents were heated to 140° C. and melted. Magnesium acetate tetrahydrate (0.3 mass parts) and antimonous oxide (0.05 mass parts) were added to the contents under stirring, and then transesterification was performed at 140-230° C. while distilling methanol. Subsequently, a solution containing 5 mass % trimethylphosphate in ethylene glycol (0.5 mass parts) (0.025 mass parts as trimethylphosphate) and a solution containing 5 mass % sodium dihydrogen phosphate dihydrate in ethylene glycol (0.3 mass parts) (0.015 mass parts as sodium dihydrogen phosphate dihydrate) were added to the contents.

Addition of an ethylene glycol solution of trimethylphosphate lowers the temperature of reaction contents. Thus, the reaction contents were kept being stirred while excess ethyleneglycol was distilled until the temperature returned to 230° C. After the temperature of the reaction contents in the transesterification reactor reached 230° C., the reaction contents were transferred to a polymerization reactor.

After transferred to the polymerization reactor, in the reaction system, the pressure was lowered to 0.1 kPa while the temperature was gradually raised from 230° C. to 275° C. The times to arrive at a final temperature and a final pressure were both set at 60 minutes. When the contents were reacted for 2 hours (3 hours from the start of polymerization) after arriving at the final temperature and the final pressure, the stirring torque of the polymerization reactor read a predetermined value (though the specific value varied depending on the specification of polymerization reactor, for this polymerization reactor, the value corresponding to the polyethylene terephthalate with intrinsic viscosity of 0.55 was used as the predetermined value). The reaction system was then purged using nitrogen to normal pressure to terminate the polycondensation reaction, and the reaction contents were discharged into cold water in the form of strand, and cut immediately to obtain copolymerized PET pellet of polyethylene terephthalate with intrinsic viscosity (ortho-chlorophenol, 35° C.) of 0.55 dl/g (source material-1b).

The above-mentioned PET pellet (source material-1b) was heat-treated for an extended period of time at a temperature of 230° C. under reduced pressure of 0.1 kPa using a rotary type vacuum polymerization reactor, and solid-phase polymerization was continued until intrinsic viscosity (ortho-chlorophenol, 35° C.) of 0.70 dl/g was achieved (source material-1bk).

(2) Preparation of PET pellet containing particles: The above-mentioned solid-phase polymerized PET pellet (source material-1k: 2 hours of processing time) (90 mass parts) and water slurry containing 10 mass % cross-linked polystyrene particle having a mean particle size of 0.30 μm (10 mass parts) (1 mass part as a cross-linked polystyrene particle) was supplied to a vent type co-rotation twin screw kneading extruder heated to 280° C., and a vent hole was controlled to keep reduced pressure of 1 kPa or less to remove water, and particle-containing pellet (source material-2) with intrinsic viscosity (ortho-chlorophenol, 35° C.) of 0.62 dl/g containing 1 mass % of cross-linked polystyrene particle was obtained.

(3) Preparation of 2-component composition (PET/PEI) pellet: The solid-phase polymerized PET pellet (source material-1ak: 2 hours of processing time) obtained by the above-mentioned method and PEI "Ultem" (registered trademark) 1010 pellet manufacture by SABIC Innovative Plastics Corporation were supplied to a vent type co-rotation twin screw kneading extruder (manufactured by The Japan Steel Works, LTD., screw diameter 30 mm, screw length/screw diameter=45.5) with 3 kneading portions equipped with paddle parts heated to a temperature of 280° C. and melt extruded, for a residence time of 1 minute at a shear rate of 100 sec$^{-1}$ to obtain 2-component composition pellet containing 50 mass % PEI. The glass transition temperature of the 2-component composition pellet was 150° C. (source material-3).

Example 6

PET pellet (source material-1ak) (90 mass parts) and particle-containing PET pellet (source material-2) (10 mass parts) were each dried at 170° C. for 3 hours, and supplied to the hopper of an extruder, melted at 280° C. in the extruder, and extruded from a T-die onto the surface of a casting drum which had a surface finish of 0.3 S and a surface temperature kept at 20° C., and quenched and solidified to obtain an unstretched film.

The resulting unstretched film was preheated at 70° C., stretched 4 times between a low speed roll and a high-speed roll by heating with an infrared heater with a surface temperature of 800° C. located 14 mm above the film, quenched, then supplied to a stenter, stretched laterally 3.5 times at 100° C., and was heat set at 205° C. for 3 seconds to obtain a film having a thickness of 3.5 μm. The characteristics of the film and magnetic tape obtained are shown in Table 1.

Example 7

PET pellet (source material-1ak) (70 mass parts), particle-containing PET pellet (source material-2) (10 mass parts) and polyetherimide-containing PET pellet (source material-3) (20 mass parts) were mixed and then dried, and an unstretched film was obtained in the similar manner as in Example 6. A film having a thickness of 3.7 μm was obtained in the similar manner as in Example 6 except that the stretching ratio was changed as described in Table 1. The characteristics of the film and magnetic tape obtained are shown in Table 1.

Example 8

PET pellet (source material-1ak) (40 mass parts), isophthalic acid-copolymerized PET pellet (source material-1bk) (30 mass parts), particle-containing PET pellet (source material-2) (10 mass parts) and polyetherimide-containing PET pellet (source material-3) (20 mass parts) were mixed and then dried, and an unstretched film was obtained in the similar manner as in Example 6. A film having a thickness of 4.2 μm was obtained in the similar manner as in Example 6 except that the stretching ratio was changed as described in Table 1. The characteristics of the film and magnetic tape obtained are shown in Table 1.

Example 9 polyether ether ketone resin (manufacture by Victrex plc: polyetheretherketone 381 G, Tg: 142° C., Tm: 343° C.) as thermoplastic polyether ketone resin was blended with spherical silica particles having a mean particle size 0.3 μm (0.1 mass parts) as inert microspheres, and the mixture was dried at 150° C. for 3 hours, melt extruded at 380° C. by an extruder, and cast onto a casting drum kept at 80° C. to obtain an unstretched film.

Subsequently, the film was stretched successively first in the lengthwise direction and next in the lateral direction according to the following described conditions, and subjected to heat set and heat relaxation to obtain a biaxially stretched film having a thickness of 3 μm.

That is, the unstretched film was stretched 2.8 times at 155° C. in the lengthwise direction (machine direction), conveyed to a tenter, preheated for 20 seconds in a step: from a temperature 95° C. at a beginning portion of preheating to a temperature (temperature at a portion of starting stretch) of 145° C. at an ending portion of preheating, and then stretched 2.5 times in the lateral direction (the direction perpendicular to the machine direction and the thickness direction). In this case, the lateral stretching speed was 5000%/min. In addition, the temperature of the lateral stretching was 145° C. at the first stage, 150° C. at the second stage and 160° C. at the third stage (final stage). Subsequently, the film was heat set at 245° C. for 5 seconds, and subjected to relaxation of 3% laterally while cooled to 180° C. to obtain a biaxially stretched film having a thickness of 3.0 μm. The characteristics of the film and magnetic tape obtained are shown in Table 1.

Example 10

The particle-containing polyether ether ketone resin used in Example 9 was referred to as PEEK-1, and another polyether ether ketone resin PEEK-2 which was blended with spherical silica particles having a mean particle size of 0.1 μm (0.1 mass parts) was separately prepared. Each resin was dried for 3 hours at 150° C., provided into two different extruder separately, joined at a feed block to be a 2-layered film, and an unstretched film was obtained in a similar manner as in Example 9. A biaxially stretched film having a thickness of 3.5 μm was obtained in the similar manner as in Example 9 except that only the stretching ratio was changed as described in Table 1. The characteristics of the film and magnetic tape obtained are shown in Table 1.

Preparation of PPS Resin

PPS-1

Sodium sulfide (containing 49 wt % crystal water) (16.5 kg), sodium hydroxide (6.5 kg), sodium acetate (5.2 kg) and N-methyl-2-pyrrolidone (hereinafter, optionally abbreviated as NMP) (22.0 kg) were loaded and dehydrated at 210° C., and then 1,4-dichlorobenzene (abbreviated as p-DCB) (20.5 kg) and NMP (20.0 kg) were added to the mixture, and the resulting mixture was subjected to reaction at 265° C. for 5 hours. The reaction product was washed with water and dried to obtain phenylenesulfide. The PPS obtained had a glass transition temperature of 90° C., a melting point of 280° C., a number average molecular weight of 11500, and a weight-average molecular weight of 40000 and contained a sodium element content of 165 ppm and a chlorine element content of 2000 ppm.

PPS-2

PPS-1 was washed with ion exchanged water (70 L) containing acetic acid (32 g), washed with water again, and dried to obtain phenylenesulfide. The PPS obtained had a glass transition temperature of 90° C., a melting point of 280° C., a number average molecular weight of 11500, and a weight-average molecular weight of 40000, and a sodium element content of 85 ppm and a chlorine element content of 300 ppm.

PPS-3

Diphenyl disulfide was further added to diiodobenzene and sulfur, and the mixture was heated to 180° C. to be completely melted and mixed, the mixture was heated to a temperature of 220° C. and the pressure was reduced to 200 Torr. The mixture obtained was subjected to polymerization reaction for 8 hours, while temperature and pressure were changed stepwise to the final temperature of 320° C. and the final pressure of 1 Torr. PPS-3 was obtained by the above-mentioned polymerization reaction. The PPS-3 obtained had a glass transition temperature of 90° C., a melting point of 277° C., a number average molecular weight of 12000, and a weight-average molecular weight of 42000, and the sodium element content was undetectable (less than 50 ppm) and the chlorine element content was also undetectable (less than 50 ppm).

Example 11

To the above-mentioned PPS-3, 3,9-bis[2-[3-(3-t-butyl-4-hydroxy-5-methylphenyl)propionyloxy]-1,1-dimethylethyl]-2,4,8,10-tetraoxaspiro[5.5]undecane (manufactured by SUMITOMO CHEMICAL Co., Ltd.: product name SUMILIZERGA-80, 1 mass % loss temperature: 348° C., melting point: 120° C.) (2 mass %) as antioxidant (B) and cross-linked polystyrene particles having a mean particle size of 0.3 μm (such that the amount was 0.1 mass % based on the weight of the biaxially stretched film to be obtained) as inert particles were added, and the mixture was kneaded using a twin extruder to obtain a PPS resin composition. The PPS resin composition was dried under reduced pressure at 170° C. for 4 hours, melt extruded at 290° C. by an extruder through a die having linear lip, cast onto the surface kept at 25° C. of a metal drum, and cooled and solidified to obtain an unstretched film.

The film was stretched 3.5 times at a film temperature of 100° C. by a vertical drawing device consisting of a group of rolls, and then stretched 3.5 times at a final width stretching temperature of 105° C. using a tenter, and further heat treated for 15 seconds at 2650 under tension in the following heat-treatment chamber, and then relaxed to 4% in the width direction at 170° C. to obtain a PPS biaxially stretched film having a thickness of 3 μm. In this case, a lateral stretching portion was divided into three zones (first zone, second zone and third zone), the stretching in the first zone was 1.8 times at a temperature of 95° C., 1.49 times at a temperature of 100° C. for the second zone and 1.4 times at a temperature of 105° C. for the third zone. The stretching ratio for each zone is the ratio of a width at exit to a width at entrance in each zone. The characteristics of the film and magnetic tape obtained were shown in Table 1.

Example 12

Dimethyl 2,6-naphthalenedicarboxylate (125 parts) and trimethylene glycol (60 parts) were subjected to transesterification in accordance to normal procedure in the art by using manganese acetate tetrahydrate (0.03 parts) as a transesterification catalyst and adding silica particles having a mean particle size of 0.3 μm (such that the amount was 0.05 wt % based on the weight of the polymer to be finally obtained) as a lubricant, and trimethyl phosphate (0.023 parts) was added to the reaction mixture to substantially terminate the transesterification. Then, antimonous oxide (0.024 parts) was added to the mixture, and the mixture was polymerized in accordance to normal procedure in the art, under high temperature and high vacuum to obtain a polyethylene-2,6-naphthalate copolymer with intrinsic viscosity of 0.61 dl/g. The polymer pellet obtained was dried at 150° C. for 4 hours, and melted at 280° C. in an extruder, and extruded from a T-die onto the surface of a casting drum which had a surface finish of 0.3 S and a surface temperature kept at 20° C., and quenched and solidified to obtain an unstretched film. The unstretched film obtained was preheated at 75° C., stretched 4 times between a low-speed roll and a high-speed roll by heating with an infrared heater with a surface temperature of 800° C. located 14 mm above the film, quenched, then supplied to a stenter, preheated at 80° C., then stretched laterally 3 times at 110° C., and was heat set at 145° C. for 3 seconds to obtain a film having a thickness of 4.5 j±m. The characteristics of the film and magnetic tape obtained are shown in Table 1.

Example 13

To nylon MXD6 (grade S6007) (0.15 wt %) manufactured by Mitsubishi Gas Chemical, cross-linked polystyrene particles having an average particle size of 0.2 μm was added as inert particles, and the mixture was dried at 170° C. for 4 hours, melted at 260° C. in an extruder, and extruded through a T-die onto the surface of a casting drum which had a surface finish of 0.3 S and a surface temperature kept at 30° C., and quenched and solidified to obtain an unstretched film.

The unstretched film obtained was conveyed to a linear motor type simultaneous biaxially stretching device, preheated at 85° C., then stretched 3.6 times longitudinally and 3.6 times laterally at 120° C., and further heat set at 210° C. for 10 seconds in an oven to obtain a film having a thickness of 4 μm. The characteristics of the film and magnetic tape obtained are shown in Table 1.

Example 14

Polypropylene resin pellets having a weight-average molecular weight (Mw) of $3.1 \times 10^5$, a molecular weight distribution (Mw/Mn) of 7.4, an isotactic component amount of 97.7 mass % were supplied to an extruder, melted at a resin temperature of 250° C., extruded through a T-die, wound around a metal drum of which the surface is kept at 90° C., and solidified to produce an unstretched cast web sheet having a thickness of about 200 μm. The unstretched cast web sheet was continuously kept at 140° C., and stretched 5 times lengthwise in the flow direction, and cooled to room temperature immediately. Next, the sheet was stretched laterally 10 times in the width direction at 170° C. in a tenter to obtain a thin biaxially stretched polypropylene film having a thickness of 4.0 μm. The characteristics of the film and magnetic tape obtained are shown in Table 1.

Comparative Example 1

A film was obtained using the same resin as in Example 6 in the similar manner as in Example 6 except that the stretching ratio and the thickness were changed as described in Table 1. The characteristics of the film and magnetic tape obtained are shown in Table 1. Since the product of the vertical Young's modulus multiplied by the thickness was beyond the range of the present invention, a dimensional change when the tension was changed in the width direction of the magnetic tape was small.

Comparative Example 2

A film was obtained using the same resin as in Example 1 in the similar manner as in Example 6 except that the stretching ratio and the thickness were changed as described in Table 1. The characteristics of the film and magnetic tape obtained are shown in Table 1. Since the product of the vertical Young's modulus multiplied by the thickness was beyond the range of the present invention, a dimensional change when the tension was changed in the width direction of the magnetic tape was small.

Comparative Example 3

Isophthalic acid-copolymerized PET pellets (source material-1bk) (90 mass parts) and particle-containing PET pellets (source material-2) (10 mass parts) were mixed and then dried at 150° C. for 6 hours, and an unstretched film was obtained in the similar manner as in Example 6. The unstretched film obtained was stretched at a ratio described in Table 1 to obtain a film having a thickness of 4 μm. Though the product of the vertical Young's modulus multiplied by the thickness for the film obtained was within the range of the present invention, a large stretch under a weight load and high temperature caused wrinkles in a step of coating magnetic paint, resulting in poor process suitability.

Comparative Example 4

Dimethyl terephthalate (100 mass parts), 1,3-propanediol (60 mass parts) and tetrabutyl titanate (0.08 mass parts) were used and transesterification was performed. Next, spherical silica particles having a mean particle size of 0.3 μm (such that the amount was 0.05 wt % based on the weight of the polymer) as a lubricant were added to the reaction mixture, and the reaction mixture was subjected to a polycondensation reaction to obtain polytrimethylene terephthalate with intrinsic viscosity of 0.65 dl/g.

After the polytrimethylene terephthalate was melt extruded through a slit die, the extruded product was, cooled and solidified under direct contact with the casting drum to obtain an unstretched film. The unstretched film was successively stretched 3.1 times in lengthwise direction (machine direction) at 55° C. while heated with an infrared heater and 3.4 times in the lateral direction (width direction) at 55° C. in a tenter, and heat treated at 150° C. while relaxed to 3% in the width direction to obtain a biaxially stretched film having a thickness of 4 μm. Though the product of the vertical Young's modulus multiplied by the thickness of the film obtained was within the range of the present invention, a large stretch under a weight load and high temperature caused wrinkles in a step of coating magnetic paint, resulting in poor process suitability.

Comparative Example 5

Though it was attempted to obtain a film using the same polymer as in Example 6 by changing the stretching ratio and the thickness as described in Table 1, film was not obtained due to breakage during lateral stretching.

TABLE 1

| No. | Resin | Copolymer component Type | Ratio mol % | Blend component Type | Ratio wt % | Stretching ratio MD | Stretching ratio TD | Thickness μm | YMD GPa | YTD GPa | YMD × thickness GPa × μm | DMA tanδ °C.(Peak) | TMA %(110° C.) | Processability | Tension change ppm/N |
|---|---|---|---|---|---|---|---|---|---|---|---|---|---|---|---|
| Example 1 | PEN | | | | | 4.0 | 5.8 | 3.0 | 6.0 | 11.0 | 18 | 150 | 0.5 | Excellent | 960 |
| Example 2 | PEN | | | | | 4.0 | 4.0 | 3.3 | 6.0 | 6.0 | 19.8 | 150 | 0.5 | Excellent | 928 |
| Example 3 | PEN | | | | | 3.0 | 6.0 | 4.0 | 5.0 | 12.0 | 20 | 150 | 0.6 | Excellent | 928 |
| Example 4 | PEN | IA | 5 | | | 4.3 | 6.0 | 2.5 | 5.7 | 10.0 | 14.25 | 140 | 0.7 | Excellent | 1112 |
| Example 5 | PEN | | | | | 1.0 | 5.0 | 3.5 | 4.5 | 13.0 | 15.75 | 150 | 0.7 | Excellent | 1024 |
| Example 6 | PET | | | | | 4.0 | 3.5 | 3.5 | 5.5 | 5.0 | 19.25 | 120 | 0.8 | Excellent | 936 |
| Example 7 | PET | | | PEI | 10 | 3.9 | 3.5 | 3.7 | 5.3 | 5.0 | 19.61 | 130 | 0.8 | Excellent | 912 |
| Example 8 | PET | IA | 3 | PEI | 10 | 4.0 | 4.0 | 4.2 | 4.5 | 4.5 | 18.9 | 123 | 1.2 | Good | 1048 |
| Example 9 | PEEK | | | | | 2.8 | 2.5 | 3.0 | 6.0 | 5.0 | 18 | 190 | 0.4 | Excellent | 976 |
| Example 10 | PEEK | | | | | 2.3 | 2.9 | 3.5 | 4.8 | 6.0 | 16.8 | 190 | 0.5 | Excellent | 1002 |
| Example 11 | PPS | | | | | 3.5 | 3.5 | 3.0 | 5.6 | 5.2 | 16.8 | 140 | 0.7 | Excellent | 1024 |
| Example 12 | C3Q | | | | | 4.0 | 3.0 | 4.5 | 4.0 | 3.0 | 18 | 117 | 0.9 | Good | 968 |
| Example 13 | MXD6 | | | | | 3.3 | 3.0 | 4.0 | 4.5 | 4.5 | 18 | 135 | 1.0 | Excellent | 968 |
| Example 14 | PP | | | | | 4.0 | 8.0 | 3.0 | 3.5 | 5.7 | 10.5 | 20 | 1.6 | Good | 1256 |
| Comparative Example 1 | PET | | | | | 3.6 | 4.0 | 5.0 | 5.0 | 6.0 | 25 | 120 | 0.7 | Excellent | 800 |
| Comparative Example 2 | PEN | | | | | 4.5 | 4.0 | 3.0 | 7.5 | 6.0 | 22.5 | 150 | 0.5 | Excellent | 832 |
| Comparative Example 3 | PET | IA | 9 | | | 4.0 | 4.0 | 4.0 | 4.5 | 4.5 | 18 | 97 | 4.0 | Poor | — |
| Comparative Example 4 | C3T | | | | | 3.0 | 3.0 | 4.0 | 2.7 | 2.8 | 10.8 | 78 | 5.2 | Poor | — |
| Comparative Example 5 | PET | | | | | 3.0 | 4.0 | 0.5 | No sample obtained | — | — | — | — | — | — |

*Copolymer component ratio: mole fraction based on acid or glycol as 100
*Blend component ratio: weight fraction based on whole polymer as 100

In Table 1, the following abbreviations are used, PEN: polyethylene-2,6-naphthalate, PET: polyethylene terephthalate, PEEK: polyether etherk etone, SPS: syndiotactic polystyrene, PPS: polyphenylene sulfide, C3Q: polytrimethylene-2,6-naphthalate, MXD6: nylon MXD6 (grade S6007) a product manufactured by Mitsubishi Gas Chemical, PP: polypropylene, C3T: polytrimethylene terephthalate, PEI: polyetherimide, PPE: polyphenylene ether, YMD: Young's modulus in MD direction, YTD: Young's modulus in TD direction.

An example of the second embodiment is explained taking examples of Examples 15-27 and Comparative Example 6-9, but the present invention is not limited by these examples.

Example 15

Dimethyl 2,6-naphthalenedicarboxylate (93.2 parts), dimethyl isophthalate (5.6 parts) (7 mol % based on the total amount of all dicarboxylate components) and ethylene glycol (60 parts) were subjected to transesterification in accordance to normal procedure in the art by using manganese acetate tetrahydrate (0.03 parts) as a transesterification catalyst and adding cross-linked polystyrene particles having a mean particle size of 0.3 μm (0.1 wt %) as lubricant, and trimethyl phosphate (0.023 parts) was added to the reaction mixture to substantially terminate the transesterification.

Then, antimonous oxide (0.024 parts) was added to the mixture, and the mixture was polymerized in accordance to normal procedure in the art, under high temperature and high vacuum to obtain PEN resin composition 1, which had intrinsic viscosity (ortho-chlorophenol, 35° C.) of 0.60 dl/g and is a polyethylene-2,6-naphthalate copolymer (DEG copolymerization amount 1.1 mol %) containing cross-linked polystyrene particles. The PEN resin composition 1 obtained was dried at 160° C. for 6 hours, supplied to a hopper of an extruder, melted at 290° C. in the extruder, extruded from a T-die onto the surface of a casting drum which had a surface finish of 0.3 S and a surface temperature kept at 60° C., and quenched and solidified to obtain an unstretched film.

The unstretched film obtained was supplied to a stenter, stretched laterally 5.8 times at 150° C., and was heat set at 190° C. for 3 seconds to obtain a film having a thickness of 4.0 μm. The Young's modulus of the film obtained was 4 GPa in the lengthwise direction and 9 GPa in the lateral direction. The characteristics of the film and magnetic tape obtained are shown in Table 2.

Example 16

Dimethyl 2,6-naphthalenedicarboxylate (97.2 parts), dimethyl isophthalate (2.4 parts) (3 mol % based on the total amount of all dicarboxylate components) and ethyleneglycol (60 parts) were subjected to transesterification in accordance to normal procedure in the art by using manganese acetate tetrahydrate (0.03 parts) as a transesterification catalyst and adding cross-linked polystyrene particles having a mean particle size of 0.2 μm (0.1 wt %) as a lubricant, and trimethyl phosphate (0.023 parts) was added to the reaction mixture to substantially terminate the transesterification.

Then, antimonous oxide (0.024 parts) was added to the mixture, and the mixture was polymerized in accordance to normal procedure in the art, under high temperature and high vacuum to obtain PEN resin composition 1, which had intrinsic viscosity (ortho-chlorophenol, 35° C.) of 0.60 dl/g and is a polyethylene-2,6-naphthalate copolymer (DEG copolymerization amount 1.1 mol %) containing cross-linked polystyrene particles. The copolymer obtained was, in the similar manner as in Examples 15, dried, extruded to obtain an unstretched film, and then the resulting unstretched film was supplied to a stenter, and stretched laterally 6 times at 150° C., and was heat set at 190° C. for 3 seconds to obtain a film having a thickness of 4 μm. The characteristics of the film and magnetic tape obtained are shown in Table 2.

Preparation of PET-Based Source Material 1-a) Preparation of PET-based source material: Dimethyl terephthalate (194 mass parts) and ethyleneglycol (124 mass parts) were loaded in a transesterification reactor, and the contents were heated to 140° C. and melted. Magnesium acetate tetrahydrate (0.3 mass parts) and antimonous oxide (0.05 mass parts) were added to the contents under stirring, and then subjected to transesterification at 140-230° C. while methanol was distilled. Subsequently, a solution containing 5 mass % trimethylphosphate in ethylene glycol (0.5 mass parts) (0.025 mass parts as trimethylphosphate) and a solution containing 5 mass % sodium dihydrogen phosphate dihydrate in ethylene glycol (0.3 mass parts) (0.015 mass parts as sodium dihydrogen phosphate dihydrate) were added to the contents.

Addition of an ethylene glycol solution of trimethylphosphate lowers the temperature of the reaction contents. Thus, the reaction contents were kept being stirred while excess ethyleneglycol was distilled until the temperature returned to 230° C. After the temperature of the reaction contents in the transesterification reactor reached 230° C., the reaction contents were transferred to a polymerization reactor.

After transferred to the polymerization reactor, in the reaction system, the pressure was lowered to 0.1 kPa while the temperature was gradually raised from 230° C. to 275° C. The times to arrive at the final temperature and the final pressure were both set at 60 minutes. When the contents were reacted for 2 hours (3 hours from the start of polymerization) after arriving at the final temperature and the final pressure, the stirring torque of the polymerization reactor read a predetermined value (though the specific value varied depending on the specification of polymerization reactor, for this polymerization reactor, the value corresponding to the polyethylene terephthalate with intrinsic viscosity of 0.55 is used as the predetermined value). The reaction system was then purged using nitrogen to normal pressure to terminate the polycondensation reaction, and the reaction contents were discharged into cold water in the form of a strand, and cut immediately to obtain PET pellets of polyethylene terephthalate having intrinsic viscosity (ortho-chlorophenol, 35° C.) of 0.55 dl/g (source material-1a).

The above-mentioned PET pellets (source material-1a) were heat-treated for an extended period of time at a temperature of 230° C. under reduced pressure of 0.1 kPa using a rotary type vacuum polymerization reactor, and subjected to solid-phase polymerization to obtain PET pellets with intrinsic viscosity (ortho-chlorophenol, 35° C.) of 0.70 dl/g (source material-1ak).

(1-b) Preparation of copolymerised PET pellets: Dimethyl terephthalate (180 mass parts), dimethyl isophthalate (20 mass parts) and ethyleneglycol (129 mass parts) were loaded in a transesterification reactor, and the contents were heated to 140° C. and melted. Magnesium acetate tetrahydrate (0.3 mass parts) and antimonous oxide (0.05 mass parts) were added to the contents under stirring, and then the contents was subjected to transesterification at 140-230° C. while methanol was distilled. Subsequently, a solution containing 5 mass % trimethylphosphate in ethylene glycol (0.5 mass parts) (0.025 mass parts as trimethylphosphate) and a solution containing 5 mass % sodium dihydrogen phosphate dihydrate in ethylene glycol (0.3 mass parts) (0.015 mass parts as sodium dihydrogen phosphate dihydrate) were added to the contents.

Addition of an ethylene glycol solution of trimethylphosphate lowers the temperature of the reaction contents. Thus, the reaction contents were kept being stirred while excess ethyleneglycol was distilled until the temperature returned to 230° C. After the temperature of the reaction contents in the transesterification reactor reached 230° C., the reaction contents was transferred to a polymerization reactor.

After transferred to the polymerization reactor, in the reaction system, the pressure was lowered to 0.1 kPa while the temperature was gradually raised from 230° C. to 275° C. The times to arrive at the final temperature and the final pressure were both set at 60 minutes. When the contents were reacted for 2 hours (3 hours from the start of polymerization) after arriving at the final temperature and the final pressure, the stirring torque of the polymerization reactor read a predetermined value (though the specific value varied depending on the specification of polymerization reactor, for this polymerization reactor, the value corresponding to the polyethylene terephthalate with intrinsic viscosity (ortho-chlorophenol, 35° C.) of 0.55 is used as the predetermined value). The reaction system was then purged using nitrogen to normal pressure to terminate the polycondensation reaction, and the reaction contents were discharged into cold water in the form of a strand, and cut immediately to obtain copolymerised PET pellets of polyethylene terephthalate with intrinsic viscosity of 0.55 dl/g (source material-1b).

The above-mentioned PET pellets (source material-1b) were heat-treated for an extended period of time at a temperature of 230° C. under reduced pressure of 0.1 kPa using a rotary type vacuum polymerization reactor, and subjected to solid-phase polymerization to obtain PET pellets with intrinsic viscosity (ortho-chlorophenol, 35° C.) of 0.70 dl/g (source material-1bk).

(2) Preparation of PET pellet containing particles: The above-mentioned solid-phase polymerized PET pellets (source material-1ak: 2 hours of processing time) (90 mass parts) and water slurry containing 10 mass % cross-linked polystyrene particles having a mean particle size of 0.30 μm (10 mass parts) (1 mass part as a cross-linked polystyrene particle) was supplied to a vent type co-rotation twin screw kneading extruder heated to 280° C., and a vent hole was controlled to keep reduced pressure of 1 kPa or less to remove water, and particle-containing pellets (source material-2) with intrinsic viscosity (ortho-chlorophenol, 35° C.) of 0.62 dl/g containing 1 mass % of cross-linked polystyrene particles were obtained.

(3) Preparation of 2-component composition (PET/PEI) pellet: The solid-phase polymerized PET pellets (source material-1ak: 5 hours of processing time) obtained by the above-mentioned method and PEI "Ultem" (registered trademark) 1010 pellets manufacture by SABIC Innovative Plastics Corporation were supplied to a vent type co-rotation twin screw kneading extruder (manufactured by The Japan Steel Works, LTD., screw diameter: 30 mm, screw length/screw diameter=45.5) with 3 kneading portions equipped with paddle parts heated to a temperature of 280° C. and melt extruded, for a residence time of 1 minute at a shear rate of 100 sec$^{-1}$ to obtain 2-component composition pellets containing 50 mass % PEI. The glass transition temperature of 2-component composition pellet was 150° C. (source material-3).

Example 17

PET pellets (source material-1ak) (90 mass parts) and particle-containing PET pellets (source material-2) (30 mass parts) were each dried at 170° C. for 3 hours, and supplied to a hopper of an extruder, melted at 280° C. in the extruder, and extruded from a T-die onto the surface of a casting drum which had a surface finish of 0.3 S and a surface temperature kept at 20° C., and quenched and solidified to obtain an unstretched film.

The resulting unstretched film was preheated at 70° C., stretched 3 times between a low speed roll and a high-speed roll by heating with an infrared heater with a surface temperature of 800° C. located 14 mm above the film, quenched, then supplied to a stenter, stretched laterally 4.8 times at 100° C., and was heat set at 205° C. for 3 seconds to obtain a film having a thickness of 4 μm. The characteristics of the film and magnetic tape obtained are shown in Table 2.

Example 18

A film having a thickness of 5 μm was obtained in the similar manner as in Example 17. The characteristics of the film and magnetic tape obtained are shown in Table 2.

Example 19

PET pellets (source material-1ak) (70 mass parts), particle-containing PET pellets (source material-2) (10 mass parts) and polyetherimide-containing PET pellets (source material-3) (20 mass parts) were mixed and then dried, and an unstretched film was obtained in the similar manner as in Example 3. A film having a thickness of 4.5 m was obtained in the similar manner as in Example 17. The characteristics of the film and magnetic tape obtained are shown in Table 2.

Example 20

PET pellets (source material-1ak) (20 mass parts), isophthalic acid-copolymerized PET pellets (source material-1bk) (50 mass parts), particle-containing PET pellets (source material-2) (10 mass parts) and polyetherimide-containing PET pellets (source material-3) (20 mass parts) were mixed and then dried, and an unstretched film was obtained in the similar manner as in Example 3. A film having a thickness of 4.5 μm was obtained in the similar manner as in Example 17 except that the stretching ratio was changed as described in Table 1. The characteristics of the film and magnetic tape obtained are shown in Table 2.

Example 21

An unstretched film was obtained using the same polymer as in Example 3 in the similar manner as in Example 17. The unstretched film obtained was supplied to a stenter, stretched laterally 5 times at 110° C., and was heat set at 190° C. for 3 seconds to obtain a film having a thickness of 4 μm. The characteristics of the film and magnetic tape obtained are shown in Table 2.

Example 22

A mixture was prepared by blending polyether ether ketone resin (manufacture by Victrex plc: polyether ether ketone 381 G, Tg: 142° C., Tm: 343° C.) as thermoplastic polyether ketone resin and spherical silica particles having a mean particle size of 0.2 μm (0.2 mass parts) as inert microsphere. After drying the mixture at 150° C. for 3 hours, it was melt extruded at 380° C. by an extruder, and cast onto a casting drum kept at 80° C. to obtain an unstretched film.

Subsequently, the film was stretched successively first in the lengthwise direction and next in the lateral direction according to the conditions described below, and subjected to heat set and heat relaxation to obtain a biaxially stretched film having a thickness of 3 μm.

That is, the unstretched film was stretched 2.5 times at 155° C. in the lengthwise direction (machine direction) followed by being conveyed to a tenter, preheated for 20 seconds in a step: from a temperature 95° C. at a beginning portion of preheating to a temperature (temperature at a portion of starting stretching) of 145° C. at an ending portion of preheating, and then stretched 4 times in the lateral direction (the direction perpendicular to the machine direction and the thickness direction). In this case, the lateral stretching speed was 5000%/m. In addition, the temperature for the lateral stretching was 145° C. at the first stage, 150° C. at the second stage and 160° C. at the third stage (final stage). Subsequently, the film was heat set at 245° C. for 5 seconds, and subjected to relaxation of 3% laterally while being cooled to 180° C. to obtain a biaxially stretched film having a thickness of 3.0 μm. The characteristics of the film and magnetic tape obtained are shown in Table 2.

Example 23

The particle-containing polyether ether ketone resin used in Example 22 was referred to as PEEK-1, and another polyether ether ketone resin PEEK-2 which was blended with spherical silica particles having a mean particle size of 0.1 μm (0.1 mass parts) was separately prepared. Each resin was dried for 3 hours at 150° C., provided into two different extruder separately, joined at a feed block to be a 2-layered film, and an unstretched film was obtained in a similar manner as in Example 22. A biaxially stretched film having a thickness of 5 μm was obtained in the similar manner as in Example 8 except that only the thickness was changed. The characteristics of the film and magnetic tape obtained are shown in Table 2.

Preparation of PPS resin

PPS-1

Sodium sulfide (containing crystal water 49 wt %) (16.5 kg), sodium hydroxide (6.5 kg), sodium acetate (5.2 kg) and N-methyl-2-pyrrolidone (hereinafter, optionally abbreviated as NMP) (22.0 kg) were loaded and dehydrated at 210° C., and then 1,4-dichlorobenzene (abbreviated as p-DCB) (20.5 kg) and NMP (20.0 kg) were added to the mixture, and the resulting mixture was subjected to reaction at 265° C. for 5 hours. The reaction product was washed with water and dried to obtain phenylenesulfide. The PPS obtained had a glass transition temperature of 90° C., a melting point of 280° C., and a number average molecular weight of 11500, and a weight-average molecular weight of 40000, and a sodium element content of 165 ppm and a chlorine element content of 2000 ppm.

PPS-2

PPS-1 was washed with ion exchanged water (70 L) containing acetic acid (32 g), washed with water again, and dried to obtain phenylenesulfide. The PPS obtained had a glass transition temperature of 90° C., a melting point of 280° C., and a number average molecular weight of 11500, and a weight-average molecular weight of 40000, and a sodium element content of 85 ppm and a chlorine element content of 3000 ppm.

PPS-3

Diphenyl disulfide was further added to diiodobenzene and sulfur, and the mixture was heated to 180° C. to be completely melted and mixed, the mixture was heated to a temperature of 220° C. and the pressure was reduced to 200 Torr. The mixture obtained was subjected to polymerization reaction for 8 hours, while the temperature and pressure were changed stepwise to the final temperature of 320° C. and final pressure of 1 Torr. PPS-3 was obtained by the above-mentioned polymerization reaction. The PPS-3 obtained had a glass transition temperature of 90° C., a melting point of 277° C., a number average molecular weight of 12000, and a weight-average molecular weight of 42000, and the sodium element content was undetectable (less than 50 ppm) and the chlorine element content was also undetectable (less than 50 ppm).

Example 24

To the above-mentioned PPS-3, antioxidant (B): 3,9-bis [2-[3-(3-t-butyl-4-hydroxy-5-methylphenyl)propionyloxy]-1,1-dimethylethyl]-2,4,8,10-tetraoxaspiro[5.5]undecane (manufactured by SUMITOMO CHEMICAL Co., Ltd.: product name SUMILIZER GA-80, 1 mass % loss temperature: 348° C., melting point: 120° C.) (2 mass %) and inert particle: cross-linked polystyrene particles having a mean particle size of 0.2 m (such that the amount was 0.2 mass % based on the weight of the obtained biaxially stretched film) were added, and the mixture was kneaded with a twin extruder to obtain a PPS resin composition. The PPS resin composition was dried under reduced pressure at 170° C. for 4 hours, melt extruded 290° C. by an extruder through a die with linear lip, and cast onto the surface kept at 25° C. of a metal drum, cooled and solidified to obtain an unstretched film.

The film was then stretched 4 times at a final width stretching temperature of 105° C. using a tenter, and further heat treated for 15 seconds at 265° C. under tension in the following heat-treatment room, and then relaxed to 4% in width direction at 170° C. to obtain a PPS biaxially stretched film having a thickness of 5 μm. In this case, a lateral stretching portion was divided into three zones (first zone, second zone and third zone), the stretching in the first zone was 1.78 times at a temperature of 95° C., 1.5 times at the temperature of 100° C. for the second zone and 1.5 times at the temperature of 105° C. for the third zone. The stretching ratio for each zone is the ratio of the width at exit to the width at entrance in each zone. The characteristics of the film and magnetic tape obtained were shown in Table 2.

Example 25

Dimethyl 2,6-naphthalenedicarboxylate (125 parts) and trimethylene glycol (60 parts) were subjected to transesterification in accordance to normal procedure in the art using manganese acetate tetrahydrate (0.03 parts) as a transesterification catalyst and adding cross-linked polystyrene particles having a mean particle size of 0.2 µm (such that the amount was 0.25 wt % based on the weight of the polymer finally obtained) as a lubricant, and trimethyl phosphate (0.023 parts) was added to the reaction mixture to substantially terminate the transesterification. Then, antimonous oxide (0.024 parts) was added to the mixture, and the mixture was polymerized in accordance to normal procedure in the art, under high temperature and high vacuum to obtain a polyethylene-2,6-naphthalate copolymer with intrinsic viscosity (ortho-chlorophenol, 35° C.) of 0.61 dl/g. The polymer pellets obtained was dried at 150° C. for 4 hours, and melted at 280° C. in an extruder, and extruded from a T-die onto the surface of a casting drum which had a surface finish of 0.3 S and a surface temperature kept at 25° C., and quenched and solidified to obtain an unstretched film. The unstretched film obtained was preheated at 75° C., stretched 2.8 times between a low-speed roll and a high-speed roll by heating with an infrared heater with a surface temperature of 800° C. located 14 mm above the film, quenched, then supplied to a stenter, preheated at 80° C., then stretched laterally 3 times at 110° C., and was heat set at 145° C. for 3 seconds to obtain a film having a thickness of 5.5 µm. The characteristics of the film and magnetic tape obtained are shown in Table 2.

Example 26

To nylon MXD6 (grade S6007) manufactured by Mitsubishi Gas Chemical (0.15 wt %), cross-linked polystyrene particles with an average particle size of 0.2 µm as inert particle were added, and the mixture was dried at 170° C. for 4 hours, melted at 260° C. in an extruder, and extruded through a T-die onto the surface of a casting drum which had a surface finish of 0.3 S and a surface temperature kept at 30° C., and quenched and solidified to obtain an unstretched film. The unstretched film obtained was conveyed to a linear motor type simultaneous biaxially stretching device, preheated at 85° C., stretched 3 times longitudinally and 4 times laterally at 120° C., and further heat set at 210° C. for 10 seconds in an oven to obtain a film having a thickness of 5 µm. The characteristics of the film and magnetic tape obtained are shown in Table 2.

Example 27

The polypropylene resin pellets having a weight-average molecular weight (Mw) of $3.1 \times 10^5$, a molecular weight distribution (Mw/Mn) of 7.4, an isotactic component amount of 97.7 mass % was supplied to an extruder, and melted at a resin temperature of 250° C., and extruded through T-die, wound around a metal drum of which surface is kept to 90° C. and solidified to produce an unstretched cast web sheet having a thickness of about 200 µm. The unstretched cast web sheet was continuously kept at 140° C., and stretched 4 times lengthwise in the flow direction, and cooled to room temperature immediately. Next, the sheet was stretched laterally 8 times in the width direction at 170° C. in a tenter to obtain a thin biaxially stretched polypropylene film having a thickness of 3 µm. The characteristics of the film and magnetic tape obtained are shown in Table 2.

Comparative Example 6

A film was obtained using the same resin as in Example 3 in the similar manner as in Example 3 except that the stretching ratio and the thickness were changed as described in Table 1. The characteristics of the film and magnetic tape obtained are shown in Table 2. Since the thickness and the product of the vertical Young's modulus multiplied by the thickness was beyond the range of the present invention, a dimensional change when the tension was changed in the width direction of the magnetic tape was small.

Comparative Example 7

PEN resin composition 1, which contained 0.1 wt % of cross-linked polystyrene particles having a mean particle size of 0.2 µm and has intrinsic viscosity (ortho-chlorophenol, 35° C.) of 0.60 dl/g, in the form of a chip was dried at 180° C. for 5 hours, supplied to the hopper of an extruder, melted at 300° C. in the extruder, and extruded from a T die onto the surface of a casting drum which had a surface finish of 0.3 S and a surface temperature of 60° C., and quenched and solidified to obtain an unstretched film. The film was provided to a stenter without stretching longitudinally, preheated at 160° C., and stretched 5 times at 150° C. to obtain a film having a thickness of 5 µm. The characteristics of the film and magnetic tape obtained are shown in Table 2. Since the lengthwise Young's modulus and the product of the lengthwise Young's modulus multiplied by the thickness were beyond the range of the present invention, a dimensional change when produced as a tape was small.

Comparative Example 8

A mixture prepared by mixing isophthalic acid-copolymerized PET pellets (source material-1bk) (70 mass parts) and particle-containing PET pellets (source material-2) (10 mass parts) was dried at 150° C. for 6 hours, and an unstretched film was obtained in the similar manner as in Example 3. The unstretched film obtained was stretched at the ratio described in Tabled 2 to obtain a film having a thickness of 4 µm. Though the thickness, the Young's modulus, and the product of these of the film obtained was within the range of the present invention, a large stretch under a weight load and high temperature caused wrinkles in a coating magnetic paint step, resulting in poor process suitability.

Comparative Example 9

Though it was attempted to obtain a film using the same polyethylene-2,6-naphthalate resin as in Comparative Example 2 by changing the stretching ratio and the thickness as described in Table 2, the film was not obtained due to breakage during lateral stretching.

TABLE 2

| No. | Resin | Copolymer component Type | Copolymer component Ratio mol % | Blend component Type | Blend component Ratio wt % | Stretching ratio MD | Stretching ratio TD | Thickness μm | YMD GPa | YTD GPa | YMD × thickness GPa × μm | DMA tanδ °C.(Peak) | TMA %(110° C.) Stretch % | Processability | Tension change ppm/N |
|---|---|---|---|---|---|---|---|---|---|---|---|---|---|---|---|
| Example 15 | PEN | IA | 7 | | | 1.0 | 5.8 | 4.0 | 4.0 | 9.0 | 16 | 136 | 1.1 | Good | 1035 |
| Example 16 | PEN | IA | 3 | | | 1.0 | 6.0 | 4.5 | 4.0 | 10.0 | 18 | 145 | 0.8 | Excellent | 947 |
| Example 17 | PET | | | | | 3.0 | 4.8 | 4.0 | 4.0 | 8.0 | 16 | 120 | 0.8 | Excellent | 1022 |
| Example 18 | PET | | | | | 3.0 | 4.8 | 5.0 | 4.0 | 8.0 | 20 | 120 | 0.8 | Excellent | 921 |
| Example 19 | PET | | | PEI | 10 | 3.0 | 4.8 | 4.5 | 3.8 | 8.0 | 17.1 | 130 | 0.8 | Excellent | 999 |
| Example 20 | PET | IA | 5 | PEI | 10 | 3.0 | 5.0 | 4.5 | 3.5 | 7.0 | 15.8 | 120 | 1.5 | Good | 1024 |
| Example 21 | PET | | | | | 1.0 | 5.0 | 4.0 | 3.5 | 8.5 | 14 | 120 | 1.2 | Good | 1109 |
| Example 22 | PEEK | | | | | 2.5 | 4.0 | 3.0 | 3.9 | 6.5 | 11.7 | 188 | 0.4 | Excellent | 1200 |
| Example 23 | PEEK | | | | | 2.5 | 4.0 | 5.0 | 3.9 | 6.5 | 19.5 | 188 | 0.4 | Excellent | 1010 |
| Example 24 | PPS | | | | | 1.0 | 4.0 | 5.0 | 3.0 | 6.2 | 15 | 137 | 0.8 | Excellent | 1063 |
| Example 25 | C3Q | | | | | 2.8 | 3.0 | 5.5 | 2.8 | 3.9 | 15.4 | 116 | 1.2 | Good | 1002 |
| Example 26 | MXD6 | | | | | 3.0 | 4.0 | 5.0 | 4.0 | 6.0 | 20 | 135 | 1.8 | Good | 1176 |
| Example 27 | PP | | | | | 4.0 | 8.0 | 3.0 | 3.5 | 5.7 | 10.5 | 20 | 1.6 | Good | 1256 |
| Comparative Example 6 | PET | | | | | 1.0 | 5.0 | 6.5 | 3.5 | 6.0 | 22.75 | 120 | 1.2 | Good | 837 |
| Comparative Example 7 | PEN | | | | | 1.0 | 5.0 | 5.0 | 4.5 | 13.0 | 22.5 | 150 | 0.7 | Excellent | 841 |
| Comparative Example 8 | PET | IA | 7 | | | 3.5 | 3.5 | 4.0 | 4.0 | 4.0 | 16 | 116 | 2.2 | Poor | — |
| Comparative Example 9 | PEN | | | | | 3.0 | 4.0 | 0.5 | No sample obtained | | | | | | |

*Copolymer component ratio: molar fraction based on acid or glycol as 100
*Blend component ratio: weight fraction based on whole polymer as 100

In Table 2, the following abbreviations are used, PEN: polyethylene-2,6-naphthalate, PET: polyethylene terephthalate, PEEK: polyether ether ketone, SPS: syndiotactic polystyrene, PPS: polyphenylene sulfide, C3Q: polytrimethylene-2,6-naphthalate, MXD6: a product manufacture by Mitsubishi Gas Chemical nylon MXD6 (grade S6007), PP: polypropylene, C3T: polytrimethylene terephthalate, PEI: polyetherimide, PPE: polyphenylene ether, YMD: Young's modulus in the MD direction, YTD: Young's modulus in the TD direction.

An example of the third embodiment is explained taking examples of Examples 28-40 and Comparative Examples 10-14, but the present invention is not limited by these examples.

Preparation of Polyethylenenaphthalate Pellet A1

Transesterification was performed by using dimethyl 2,6-naphthalenedicarboxylate asa a dicarboxylate component and ethyleneglycol as a diol component in the presence of titanium tetrabutoxide, and the product was continuously polycondensed to obtain polyethylenenaphthalate pellet A1 (IV=0.58 dl/g, Tg=115° C., Tm=263° C.).

Preparation of Polyethylenenaphthalate Pellet A2

Transesterification was performed by using dimethyl terephthalate as a dicarboxylate component and ethyleneglycol as a diol component in the presence of titanium tetrabutoxide, and the product was continuously polycondensed to obtain polyethyleneterephthalate pellet A2 (IV=0.58 dl/g, Tg=76° C., Tm=254° C.).

Preparation of Dimer Acid-Copolymerized Polyethylenenaphthalate Pellet B1

Transesterification was performed by using dimethyl 2,6-naphthalenedicarboxylate and Priplast 1838 as a dicarboxylate component, and ethyleneglycol as a diol component in the presence of titanium tetrabutoxide, and the product was continuously polycondensed to obtain dimer acid-copolymerized polyethylenenaphthalate pellet B1 (IV=0.57 dl/g, Tg=58° C., Tm=232° C.). Besides, the amount of dimer acid as the dicarboxylate component was found to be 10.6 mol % by NMR analysis.

Preparation of Dimer Acid-Copolymerized Polyethylenenaphthalate Pellet B2

Transesterification was performed by using 2,6-naphthalenedicarboxylic acid and Pripol 1004 as a dicarboxylate component: and ethyleneglycol as a diol component in the presence of titanium tetrabutoxide, and the product was continuously polycondensed to obtain dimer acid/copolymerized polyethylenenaphthalate pellet B2 (IV=0.58 dl/g). Besides, the product was prepared so that the amount of dimer acid as an acid component was 10.6 mol %.

Preparation of Dimer Acid-Copolymerized Polyethylenenaphthalate Pellet B3

Transesterification was performed by using dimethyl terephthalate and Priplast 1838 as a dicarboxylate component, and ethyleneglycol as a diol component in the presence of titanium tetrabutoxide, and the product was continuously polycondensed to obtain dimer acid-copolymerized polyethyleneterephthalate pellet B3 (IV=0.58 dl/g, Tg=47° C., Tm=244° C.). Besides, the product was prepared so that the amount of dimer acid as the dicarboxylate component was 10.6 mol %.

Preparation of Dimer Diol-Copolymerized Polyethylenenaphthalate Pellet C1

Transesterification was performed by using dimethyl 2,6-naphthalenedicarboxylate as a dicarboxylate component and ethyleneglycol and Pripol2033 as a diol component in the presence of titanium tetrabutoxide, and the product was continuously polycondensed to obtain dimer diol-copolymerized polyethylenenaphthalate pellet C1 (IV=0.60 dl/g, Tg=77° C., Tm=250° C.). Besides, the amount of dimer diol as the diol component was found to be 10.3 mol % by NMR analysis.

Preparation of Dimer Diol-Copolymerized Polyethylenenaphthalate Pellet C2

Transesterification was performed by using dimethyl terephthalate as a dicarboxylate component and ethyleneglycol and Pripol2033 as a diol component in the presence of titanium tetrabutoxide, and the product was continuously polycondensed to obtain dimer diol-copolymerized polyethyleneterephthalate pellet C2 (IV=0.56 dl/g, Tg=50° C., Tm=249° C.). Besides, the product was prepared so that the amount of dimer diol as the diol component was 10.3 mol %.

Example 28

Pellet A1 and pellet B1 were blended at a mass ratio of 84:16 so that the composition ratio of the dimer acid became 1.2 mol %. The blended resin was extruded at 280° C. in the form of sheet onto the cooling drum under rotation at a temperature of 60° C. to obtain an unstretched film.

The unstretched film was heated so that the film surface temperature became 130° C. using an IR heater placed above the film between 2 rolls having different rotation speed along the film forming direction, and stretched in the lengthwise direction (film forming direction) at a stretching ratio of 4.0 times to obtain a uniaxially stretched film. The uniaxially stretched film was then introduced to a stenter, stretched laterally (width direction) 5.8 times at 130° C., and was heat set at 210° C. for 3 seconds to obtain a biaxially oriented polyester film having a thickness of 3.0 μm.

The characteristics of the biaxially oriented polyester film and magnetic tape obtained are shown in Table 3.

Example 29

Pellet A1 and pellet B1 were blended at a mass ratio of 58:42 so that the composition ratio of the dimer acid became 4.0 mol %. The blended resin was extruded at 280° C. in the form of sheet onto the cooling drum under rotation at a temperature of 60° C. to obtain an unstretched film.

The unstretched film was heated so that the film surface temperature became 120° C. using an IR heater placed above the film between 2 rolls having different rotation speed along the film forming direction, and stretched in the lengthwise direction (film forming direction) at a stretching ratio of 4.0 times to obtain a uniaxially stretched film. The uniaxially stretched film was then introduced to a stenter, stretched laterally (width direction) 5.8 times at 120° C., and was heat set at 200° C. for 3 seconds to obtain a biaxially oriented polyester film having a thickness of 3.0 μm.

The characteristics of the biaxially oriented polyester film and magnetic tape obtained are shown in Table 3.

Example 30

Pellet A1 and pellet B2 were blended at a mass ratio of 79:21 so that the composition ratio of the dimer acid became 1.5 mol %. The blended resin was extruded at 280° C. in the form of sheet onto the cooling drum under rotation at a temperature of 60° C. to obtain an unstretched film.

The unstretched film was heated so that the film surface temperature became 130° C. using an IR heater placed above the film between 2 rolls having different rotation speed along the film forming direction, and stretched in the lengthwise direction (film forming direction) at a stretching ratio of 4.0 times to obtain a uniaxially stretched film. The uniaxially stretched film was then introduced to a stenter, stretched laterally (width direction) 5.8 times at 130° C., and was heat set at 210° C. for 3 seconds to obtain a biaxially oriented polyester film having a thickness of 3.0 μm.

The characteristics of the biaxially oriented polyester film and magnetic tape obtained are shown in Table 3.

Example 31

Pellet A1 and pellet C1 were blended at a mass ratio of 86:14 so that the composition ratio of the dimer diol became 1.2 mol %. The blended resin was extruded at 280° C. in the form of sheet onto the cooling drum under rotation at a temperature of 60° C. to obtain an unstretched film.

The unstretched film was heated so that the film surface temperature became 130° C. using an IR heater placed above the film between 2 rolls having different rotation speed along the film forming direction, and stretched in the lengthwise direction (film forming direction) at a stretching ratio of 4.0 times to obtain a uniaxially stretched film. The uniaxially stretched film was then introduced to a stenter, stretched laterally (width direction) 5.8 times at 130° C., and was heat set at 210° C. for 3 seconds to obtain a biaxially oriented polyester film having a thickness of 3.0 μm.

The characteristics of the biaxially oriented polyester film and magnetic tape obtained are shown in Table 3.

Example 32

A biaxiall stretched film having a thickness of 3.0 μm was obtained using the unstretched film of Example 31 in the similar manner as in Example 31 except that the stretching ratio was changed as described in Table 3.

The characteristics of the biaxially oriented polyester film and magnetic tape obtained are shown in Table 3.

Example 33

Pellet A1 and pellet C1 were blended at a mass ratio of 56:44 so that the composition ratio of the dimer diol became 4.0 mol %. The blended resin was extruded at 280° C. in the form of sheet onto the cooling drum under rotation at a temperature of 60° C. to obtain an unstretched film.

The unstretched film was heated so that the film surface temperature became 120° C. using an IR heater placed above the film between 2 rolls having different rotation speed along the film forming direction, and stretched in the lengthwise direction (film forming direction) at a stretching ratio of 4.0 times to obtain a uniaxially stretched film. The uniaxially stretched film was then introduced to a stenter, stretched laterally (width direction) 5.8 times at 120° C., and was heat set at 200° C. for 3 seconds to obtain a biaxially oriented polyester film having a thickness of 3.0 μm.

The characteristics of the biaxially oriented polyester film and magnetic tape obtained are shown in Table 3.

Examples 34, 35 and 36

A biaxially stretched film was obtained in each Examples using the unstretched film of Example 31 in the similar manner as in Example 31 except that the stretching ratio and the thickness were changed as described in Table 3.

The characteristics of the biaxially oriented polyester film and magnetic tape obtained are shown in Table 3.

Example 37

Pellet A2 and pellet B3 were blended at a mass ratio of 83:17 so that the composition ratio of the dimer acid became 1.5 mol %. The blended resin was extruded at 280° C. in the form of sheet onto the cooling drum under rotation at a temperature of 25° C. to obtain an unstretched film.

The unstretched film was heated so that the film surface temperature became 90° C. using an IR heater placed above the film between 2 rolls having different rotation speed along the film forming direction, and stretched in the lengthwise direction (film forming direction) at a stretching ratio of 3.6 times to obtain a uniaxially stretched film. The uniaxially stretched film was then introduced to a stenter, stretched laterally (width direction) 4.0 times at 90° C., and was heat set at 210° C. for 3 seconds to obtain a biaxially oriented polyester film having a thickness of 3.5 μm. The characteristics of the biaxially oriented polyester film and magnetic tape obtained are shown in Table 3.

Example 38

Pellet A2 and pellet C2 were blended at a mass ratio of 86:14 so that the composition ratio of the dimer diol became 1.2 mol %. The blended resin was extruded at 280° C. in the form of sheet onto the cooling drum under rotation at a temperature of 25° C. to obtain an unstretched film. The unstretched film was heated so that the film surface temperature became 90° C. using an IR heater placed above the film between 2 rolls having different rotation speed along the film forming direction, and stretched in the lengthwise direction (film forming direction) at a stretching ratio of 3.6 times to obtain a uniaxially stretched film. The uniaxially stretched film was then introduced to a stenter, stretched laterally (width direction) 4.0 times at 90° C., and was heat set at 210° C. for 3 seconds to obtain a biaxially oriented polyester film having a thickness of 3.5 μm. The characteristics of the biaxially oriented polyester film and magnetic tape obtained are shown in Table 3.

Example 39

"Ultem1010" manufactured by SABIC Innovative Plastics company was used as polyetherimide.

The polyetherimide, pellet A2 and pellet B3 were blended at a mass ratio of 10:75:15 so that the composition ratio of the dimer acid became 1.5 mol %. The blended resin was extruded at 280° C., and extruded in the form of sheet onto the cooling drum under rotation at a temperature of 25° C. to obtain an unstretched film. The unstretched film was heated so that the film surface temperature became 100° C. with an IR heater above between 2 rolls having different rotation speed along a film forming direction, stretched in the lengthwise direction (film forming direction) at a stretching ratio of 3.8 times to obtain a uniaxially stretched film. The uniaxially stretched film was then introduced to a stenter, stretched laterally (width direction) 4.2 times at 100° C., and was heat set at 210° C. for 3 seconds to obtain a biaxially oriented polyester film having a thickness of 3.5 μm. The characteristics of the biaxially oriented polyester film and magnetic tape obtained are shown in Table 3.

Example 40

The polyetherimide, pellet A2 and pellet C2 were blended at a mass ratio of 10:77:13 so that the composition ratio of the dimer acid became 1.2 mol %. The blended resin was extruded at 280° C., and extruded in the form of sheet onto the cooling drum under rotation at a temperature of 25° C. to obtain an unstretched film. The unstretched film was heated so that the film surface temperature became 100° C. with an IR heater above between 2 rolls having different rotation speed along a film forming direction, stretched in the lengthwise direction (film forming direction) at a stretching ratio of 3.8 times to obtain a uniaxially stretched film. The uniaxially stretched film was then introduced to a stenter, stretched laterally (width direction) 4.2 times at 100° C., and was heat set at 210° C. for 3 seconds to obtain a biaxially oriented polyester film having a thickness of 3.5 μm. The characteristics of the biaxially oriented polyester film and magnetic tape obtained are shown in Table 3.

Comparative Example 10

Pellet A2 was extruded at 280° C., and extruded in the form of sheet onto the cooling drum under rotation at a temperature of 25° C. to obtain an unstretched film. The unstretched film was heated so that the film surface temperature became 90° C. with an IR heater above between 2 rolls having different rotation speed along a film forming direction, stretched in the lengthwise direction (film forming direction) at a stretching ratio of 3.6 times to obtain a uniaxially stretched film. The uniaxially stretched film was then introduced to a stenter, stretched laterally (width direction) 4.0 times at 90° C., and was heat set at 210° C. for 3 seconds to obtain a biaxially oriented polyester film having a thickness of 5.0 μm. The characteristics of the biaxially oriented polyester film and magnetic tape obtained are shown in Table 3. Since the dimensional change in width of the magnetic tape was small, the width was hard to control under the tension applied.

Comparative Example 11

Pellet A1 was extruded at 300° C., and extruded in the form of sheet onto the cooling drum under rotation at a temperature of 60° C. to obtain an unstretched film. The unstretched film was heated so that the film surface temperature became 150° C. with an IR heater above between 2 rolls having different rotation speed along a film forming direction, stretched in the lengthwise direction (film forming direction) at a stretching ratio of 4.5 times to obtain a uniaxially stretched film. The uniaxially stretched film was then introduced to a stenter, stretched laterally (width direction) 4.0 times at 150° C., and was heat set at 210° C. for 3 seconds to obtain a biaxially oriented polyester film having a thickness of 3.0 μm. The characteristics of the biaxially oriented polyester film and magnetic tape obtained are shown in Table 3. Since the width dimension change in the characteristics of magnetic tape obtained was small as in Comparative Example 10, it was hard to control width with tension.

Comparative Example 12

An unstretched film was prepared as in Comparative Example 11, and a biaxially stretched film was obtained in the similar manner as in Example 11 except that the stretching ratio and the thickness were changed as described in Table 3.

The characteristics of the biaxially oriented polyester film and magnetic tape obtained are shown in Table 3. Though the dimensional change in width in the characteristics of magnetic tape obtained was large, the width was hard to control under tension applied.

Comparative Example 13

Pellet A1 and pellet C1 were blended at a mass ratio of 37:63 so that the composition ratio of the dimer diol became 6.0 mol %. The blended resin was extruded at 280° C., and extruded in the form of sheet onto the cooling drum under rotation at a temperature of 60° C. to obtain an unstretched film.

The unstretched film was heated so that the film surface temperature became 110° C. with an IR heater above between 2 rolls having different rotation speed along a film forming direction, stretched in the lengthwise direction (film forming direction) at a stretching ratio of 4.0 times to obtain a uniaxially stretched film. The uniaxially stretched film was then introduced to a stenter, stretched laterally (width direction) 5.8 times at 110° C., and was heat set at 200° C. for 3 seconds to obtain a biaxially oriented polyester film having a thickness of 3.5 μm.

Since the polyester film obtained had a large film elongation when drying in the above-mentioned (12) Manufacturing magnetic recording tape, it was difficult to manufacture a magnetic tape, thus the characteristics were not evaluated.

The characteristics of the biaxially oriented polyester film obtained are shown in Table 3.

Comparative Example 14

An unstretched film was prepared as in Example 31, and a biaxially stretched film having a thickness of 5.0 μm was obtained in the similar manner as in Example 31 except that the stretching ratio was changed as described in Table 3. The characteristics of the biaxially oriented polyester film and magnetic tape obtained are shown in Table 3. Since the dimensional change in width of the magnetic tape was small, it was hard to control tension.

TABLE 3

|  | Resin | Dimer component | | | Blend component | | Stretching ratio | | Thickness μm | Young's modulus | | YMD × Thickness Gpa × μm |
|---|---|---|---|---|---|---|---|---|---|---|---|---|
|  |  | Type | Carbon number | Mole fraction mol % | Type | Addition amount wt % | MD Times | TD Times |  | MD GPa | TD GPa |  |
| Example 28 | PEN | Dimer acid | 36 | 1.5 | — | — | 4.0 | 5.8 | 3.0 | 6.0 | 10.0 | 18.0 |
| Example 29 | PEN | Dimer acid | 36 | 4.0 | — | — | 4.0 | 5.8 | 3.0 | 5.5 | 10.5 | 16.5 |
| Example 30 | PEN | Dimer acid | 44 | 1.5 | — | — | 4.0 | 5.8 | 3.0 | 6.0 | 10.0 | 18.0 |
| Example 31 | PEN | Dimer diol | 36 | 1.2 | — | — | 4.0 | 5.8 | 3.0 | 6.0 | 10.0 | 18.0 |
| Example 32 | PEN | Dimer diol | 36 | 1.2 | — | — | 3.8 | 5.4 | 3.0 | 5.5 | 10.5 | 16.5 |
| Example 33 | PEN | Dimer diol | 36 | 4.0 | — | — | 4.0 | 5.8 | 3.0 | 5.5 | 10.5 | 16.5 |
| Example 34 | PEN | Dimer diol | 36 | 1.2 | — | — | 3.8 | 5.4 | 2.5 | 5.5 | 10.5 | 13.8 |
| Example 35 | PEN | Dimer diol | 36 | 1.2 | — | — | 3.5 | 5.8 | 3.6 | 5.0 | 11.0 | 18.0 |
| Example 36 | PEN | Dimer diol | 36 | 1.2 | — | — | 4.0 | 5.0 | 3.0 | 5.5 | 8.5 | 16.5 |
| Example 37 | PET | Dimer acid | 36 | 1.5 | — | — | 3.6 | 4.0 | 3.5 | 5.0 | 5.5 | 17.5 |
| Example 38 | PET | Dimer diol | 36 | 1.2 | — | — | 3.6 | 4.0 | 3.5 | 5.0 | 5.5 | 17.5 |
| Example 39 | PET | Dimer acid | 36 | 1.5 | PEI | 10 | 3.8 | 4.2 | 3.5 | 5.0 | 5.5 | 17.5 |
| Example 40 | PET | Dimer diol | 36 | 1.2 | PEI | 10 | 3.8 | 4.2 | 3.5 | 5.0 | 5.5 | 17.5 |
| Comparative Example 10 | PET | — | — | — | — | — | 3.6 | 4.0 | 5.0 | 5.0 | 6.0 | 25.0 |
| Comparative Example 11 | PEN | — | — | — | — | — | 4.5 | 4.0 | 3.0 | 7.5 | 6.0 | 22.5 |
| Comparative Example 12 | PEN | — | — | — | — | — | 4.0 | 5.8 | 3.3 | 6.0 | 11.0 | 19.8 |
| Comparative Example 13 | PEN | Dimer diol | 36 | 5.0 | — | — | 4.0 | 5.8 | 3.5 | 5.0 | 9.5 | 17.5 |
| Comparative Example 14 | PEN | Dimer diol | 36 | 1.2 | — | — | 3.8 | 5.4 | 5.0 | 5.5 | 10.5 | 27.5 |

|  | αt | | αh | | DMA tanδ ° C. | TMA stretch (110° C.) ° C. | Processability | Dimensional change in width ppm/N | Easiness of controlling tension (Environment change) | | |
|---|---|---|---|---|---|---|---|---|---|---|---|
|  | MD ppm/° C. | TD ppm/° C. | MD ppm/% RH | TD ppm/% RH |  |  |  |  | A N | B N | A + B N |
| Example 28 | 12.5 | −6.8 | 9.4 | 5.2 | 137 | 1.1 | Excellent | 984 | 0.23 | 0.36 | 0.58 |
| Example 29 | 15.3 | −5.5 | 10.3 | 4.7 | 121 | 1.9 | Good | 1032 | 0.20 | 0.31 | 0.51 |
| Example 30 | 12.7 | −6.7 | 9.2 | 5.0 | 136 | 1.1 | Excellent | 984 | 0.22 | 0.35 | 0.56 |
| Example 31 | 12.0 | −3.9 | 10.2 | 5.5 | 139 | 1.1 | Excellent | 984 | 0.26 | 0.32 | 0.58 |
| Example 32 | 15.8 | −5.5 | 10.8 | 5.1 | 139 | 1.2 | Excellent | 1032 | 0.21 | 0.32 | 0.53 |
| Example 33 | 15.5 | −5.1 | 10.4 | 4.6 | 120 | 1.9 | Good | 1032 | 0.20 | 0.29 | 0.49 |
| Example 34 | 15.8 | −5.5 | 11.0 | 5.0 | 139 | 1.2 | Excellent | 1134 | 0.20 | 0.25 | 0.45 |
| Example 35 | 19.0 | −7.0 | 11.9 | 4.6 | 139 | 1.3 | Good | 984 | 0.19 | 0.39 | 0.58 |
| Example 36 | 15.4 | 1.2 | 10.8 | 6.6 | 139 | 1.2 | Excellent | 1032 | 0.33 | 0.22 | 0.56 |
| Example 37 | 12.5 | 9.1 | 10.8 | 8.7 | 117 | 1.3 | Good | 999 | 0.48 | 0.12 | 0.60 |
| Example 38 | 12.6 | 9.0 | 10.7 | 8.6 | 118 | 1.3 | Good | 999 | 0.47 | 0.12 | 0.59 |
| Example 39 | 12.7 | 9.2 | 10.8 | 8.7 | 127 | 1.2 | Excellent | 999 | 0.48 | 0.12 | 0.60 |
| Example 40 | 12.5 | 9.1 | 10.9 | 8.8 | 128 | 1.2 | Excellent | 999 | 0.48 | 0.12 | 0.61 |
| Comparative Example 10 | 12.6 | 5.8 | 12.1 | 10.2 | 120 | 0.7 | Excellent | 800 | 0.67 | 0.42 | 1.09 |

TABLE 3-continued

|  | | | | | | | | | | | |
|---|---|---|---|---|---|---|---|---|---|---|---|
| Comparative Example 11 | 5.2 | 12.5 | 9.6 | 12.0 | 150 | 0.5 | Excellent | 832 | 0.72 | 0.20 | 0.92 |
| Comparative Example 12 | 12.5 | −7.2 | 12.0 | 5.4 | 150 | 0.5 | Excellent | 960 | 0.24 | 0.44 | 0.68 |
| Comparative Example 13 | 19.3 | −2.0 | 11.4 | 5.2 | 112 | 3.7 | Poor | — | — | — | — |
| Comparative Example 14 | 15.8 | −5.5 | 10.8 | 5.1 | 139 | 1.2 | Excellent | 759 | 0.27 | 0.56 | 0.83 |

An example of the fourth embodiment is explained taking examples of Examples 41-61 and Comparative Examples 15-19, but the present invention is not limited by these examples.

Preparation of Polyethylenenaphthalate Pellet A1

Transesterification was performed by using dimethyl 2,6-naphthalenedicarboxylate as a dicarboxylate component and ethyleneglycol as a diol component in the presence of titanium tetrabutoxide, and the product was continuously polycondensed to obtain polyethylenenaphthalate pellet A1 (IV=0.58 dl/g, Tg=115° C., Tm=263° C.).

Preparation of Polyethylenenaphthalate Pellet A2

Transesterification was performed by using dimethyl terephthalate as a dicarboxylate component and ethyleneglycol as a diol component in the presence of titanium tetrabutoxide, and the product was continuously polycondensed to obtain polyethyleneterephthalate pellet A2 (IV=0.58 dl/g, Tg=76° C., Tm=254° C.).

Preparation of Dimer Acid-Copolymerized Polyethylenenaphthalate Pellet B1

Transesterification was performed by using dimethyl 2,6-naphthalenedicarboxylate and Priplast 1838 as a dicarboxylate component, and ethyleneglycol as a diol component in the presence of titanium tetrabutoxide, and the product was continuously polycondensed to obtain dimer acid-copolymerized polyethylenenaphthalate pellet B1 (IV=0.60 dl/g, Tg=58° C., Tm=232° C.). Besides, the amount of dimer acid as the dicarboxylate component was found to be 10.6 mol % by NMR analysis.

Preparation of Dimer Acid-Copolymerized Polyethylenenaphthalate Pellet B2

Transesterification was performed by using 2,6-naphthalenedicarboxylic acid and Pripol1004 as a dicarboxylate component, and ethyleneglycol as a diol component in the presence of titanium tetrabutoxide, and the product was continuously polycondensed to obtain dimer acid-copolymerized polyethylenenaphthalate pellet B2 (IV=0.58 dl/g). Besides, the product was prepared so that the amount of dimer acid as an acid component was 10.6 mol %.

Preparation of Dimer Acid-Copolymerized Polyethylenenaphthalate Pellet B3

Transesterification was performed by using dimethyl terephthalate and Priplast 1838 as a dicarboxylate component, and ethyleneglycol as a diol component in the presence of titanium tetrabutoxide, and the product was continuously polycondensed to obtain dimer acid-copolymerized polyethyleneterephthalate pellet B3 (IV=0.58 dl/g, Tg=47° C., Tm=244° C.). Besides, the product was prepared so that the amount of dimer acid as the dicarboxylate component was 10.6 mol %.

Preparation of Dimer Diol-Copolymerized Polyethylenenaphthalate Pellet C1

Transesterification was performed by using dimethyl 2,6-naphthalenedicarboxylate as a dicarboxylate component and ethyleneglycol and Pripol2033 as a diol component in the presence of titanium tetrabutoxide, and the product was continuously polycondensed to obtain dimer diol-copolymerized polyethylenenaphthalate pellet C1 (IV=0.57 dl/g, Tg=77° C., Tm=250° C.). Besides, the amount of dimer diol as a diol component was found to be 10.3 mol % by NMR analysis.

Preparation of Dimer Diol-Copolymerized Polyethylenenaphthalate Pellet C2

Transesterification was performed by using dimethyl terephthalate as a dicarboxylate component and Pripol2033 and ethyleneglycol as a diol component in the presence of titanium tetrabutoxide, and the product was continuously polycondensed to obtain dimer diol-copolymerized polyethyleneterephthalate pellet C2 (IV=0.56 dl/g, Tg=50° C., Tm=249° C.). Besides, the product was prepared so that the amount of dimer diol as an diol component was 10.3 mol %.

Example 41

Film layer A was prepared by extruding pellet A1 at 300° C. Film layer B was prepared by blending pellet A1 and B1 at a mass ratio of 75:25 and extruding the blend at 280° C. A molar fraction of the dimer acid of film layer B is 2.3 mol %. Film layer A and film layer B were joined into a 2-layered film using a feed block at 300° C. so that the thickness of these films became as shown in Table 4, and the 2-layered film was extruded onto a cooling drum under rotation at a temperature of 60° C. to prepare an unstretched film.

In addition, film layer A was prepared to contain 0.1 mass % of spherical silica particles having a mean particle size of 0.1 μm based on the weight of film layer A, and film layer B was prepared to contain 0.1 mass % of spherical silica particles having a mean particle size of 0.2 μm based on the weight of film layer B.

The unstretched film was heated so that the film surface temperature became 130° C. using an IR heater placed above the film between 2 rolls having different rotation speed along the film forming direction, and stretched in the lengthwise direction (film forming direction) at a stretching ratio of 4.5 times to obtain a uniaxially stretched film. The uniaxially stretched film was then introduced to a stenter, stretched laterally (width direction) 5.0 times at 130° C., and was heat set at 210° C. for 3 seconds to obtain a biaxially oriented laminated polyester film having a thickness of 5.0 μm.

The characteristics of the biaxially oriented laminated polyester film and magnetic tape obtained are shown in Table 5.

Examples 42-55 and 57-60, and Comparative Examples 15-19

A biaxially oriented laminated polyester film was obtained in the similar manner as in Example 41 except that the composition, and coating and stretching conditions were changed as described in Table 4. The characteristics of the biaxially oriented laminated polyester film and magnetic tape obtained are shown in Table 5.

Examples 56 and 61

A biaxially oriented laminated polyester film was obtained in the similar manner as in Example 41 except that the composition, and coating and stretching conditions were changed as described in Table 4 and that coating layer A was added to the exposed surface of film layer A and coating layer B was added to the exposed surface of film layer B so that the thickness of the coating layer after drying each became 8 nm to give lubricity to the uniaxially stretched film after longitudinal stretching. Besides, solid content compositions in an aqueous coating fluid used for forming coating layer A and coating layer B are shown in the following.

Aqueous Coating Fluid Used for Forming Coating Layer A:
Solid Content Concentration 1.0 Mass %
Solid Composition
    Binder resin: acrylic-modified polyester, 67 mass %
    Inert particle: cross-linking acrylic resin particle (mean particle size 15 nm), 6 mass %
    Surfactant: NOF CORPORATION, NONION NS-208.5, 1 mass %
    Surfactant: NOF CORPORATION, NONION NS-240, 26 mass %

Aqueous Coating Fluid Used for Forming Coating Layer B:
Solid Content Concentration 1.9 Mass %
Solid Composition
    Binder resin: acrylic-modified polyester, 58 mass %
    Binder resin: methylcellulose, 20 mass %
    Binder resin: siloxane-copolymerized acrylic acid resin, 3 mass %
    Inert particle: cross-linking acrylic particle (mean particle size 40 nm), 9 mass %
    Surfactant: Sanyo Chemical Industries Ltd., NAROACTY N85, 10 mass %

The uniaxially stretched film coated with these coating layers was introduced to a stenter, stretched laterally and heat set under the conditions described in Table 4 to obtain a biaxially oriented laminated polyester film. The characteristics of the biaxially oriented laminated polyester film and magnetic tape obtained are shown in Table 5.

TABLE 4

| | Layer A | | | | | | | | Layer B | | |
|---|---|---|---|---|---|---|---|---|---|---|---|
| | | Dimer component | | | Blend component | | Particle | | | Dimer component | |
| | Pellet used | Type | Carbon number | Mole fraction mol % | Type | Ratio wt % | Type | Particle size μm | Addition amount wt % | Pellet used | Type | Carbon number |
| Example41 | A1 | — | — | — | — | — | Spherical silica | 0.1 | 0.1 | A1/B1 | Dimer acid | 36 |
| Example42 | A1/B1 | Dimer acid | 36 | 1.5 | — | — | Spherical silica | 0.1 | 0.1 | A1/B1 | Dimer acid | 36 |
| Example43 | A1 | — | — | — | — | — | Spherical silica | 0.1 | 0.1 | A1/B2 | Dimer acid | 44 |
| Example44 | A1 | — | — | — | — | — | Spherical silica | 0.1 | 0.1 | A1/C1 | Dimer diol | 36 |
| Example45 | A1 | — | — | — | — | — | Spherical silica | 0.1 | 0.1 | A1/C1 | Dimer diol | 36 |
| Example46 | A1/C1 | Dimer diol | 36 | 4.0 | — | — | Spherical silica | 0.1 | 0.1 | A1/C1 | Dimer diol | 44 |
| Example47 | A1/C1 | Dimer diol | 36 | 0.7 | — | — | Spherical silica | 0.1 | 0.1 | A1/C1 | Dimer diol | 36 |
| Example48 | A1/C1 | Dimer diol | 36 | 1.9 | — | — | Spherical silica | 0.1 | 0.1 | A1/C1 | Dimer diol | 36 |
| Example49 | A1/C1 | Dimer diol | 36 | 1.0 | — | — | Spherical silica | 0.1 | 0.1 | A1/C1 | Dimer diol | 36 |
| Example50 | A1/C1 | Dimer diol | 36 | 1.4 | — | — | Spherical silica | 0.1 | 0.1 | A1/C1 | Dimer diol | 36 |
| Example51 | A1 | — | — | — | — | — | Cross-linked PSt | 0.1 | 0.05 | A1/C1 | Dimer diol | 36 |
| Example52 | A2 | — | — | — | — | — | Spherical silica | 0.1 | 0.1 | A2/B3 | Dimer acid | 36 |
| Example53 | A2/B3 | Dimer acid | 36 | 1.5 | — | — | Cross-linked PSt | 0.1 | 0.05 | A2/B3 | Dimer acid | 36 |
| Example54 | A2 | — | — | — | — | — | Spherical silica | 0.1 | 0.1 | A2/C2 | Dimer diol | 36 |
| Example55 | A2/C2 | Dimer diol | 36 | 1.2 | — | — | Cross-linked PSt | 0.1 | 0.1 | A2/C2 | Dimer diol | 36 |
| Example56 | A2/C2 | Dimer diol | 36 | 1.2 | — | — | — | — | — | A2/C2 | Dimer diol | 36 |
| Example57 | A2 | — | — | — | PEI | 10 | Cross-linked PSt | 0.1 | 0.05 | A2/B3 | Dimer acid | 36 |
| Example58 | A2/B3 | Dimer acid | 36 | 1.5 | PEI | 10 | Cross-linked PSt | 0.1 | 0.05 | A2/B3 | Dimer acid | 36 |

TABLE 4-continued

| | | | | | | | | | | | | |
|---|---|---|---|---|---|---|---|---|---|---|---|---|
| Example59 | A2 | — | — | — | PEI | 10 | Cross-linked PSt | 0.1 | 0.05 | A2/C2 | Dimer diol | 36 |
| Example60 | A2/C2 | Dimer diol | 36 | 1.2 | PEI | 10 | Cross-linked PSt | 0.1 | 0.05 | A2/C2 | Dimer diol | 36 |
| Example61 | A2/C2 | Dimer diol | 36 | 1.2 | PEI | 10 | — | — | — | A2/C2 | Dimer diol | 36 |
| Comparative Example15 | A2 | — | — | — | — | — | Spherical silica | 0.3 | 0.1 | A2 | — | — |
| Comparative Example16 | A2 | — | — | — | — | — | Cross-linked PSt | 0.1 | 0.05 | A2 | — | — |
| Comparative Example17 | A1 | — | — | — | — | — | Spherical silica | 0.1 | 0.1 | A1 | — | — |
| Comparative Example18 | A1/C1 | Dimer diol | 36 | 5.0 | — | — | Spherical silica | 0.1 | 0.1 | A1/C1 | Dimer diol | 36 |
| Comparative Example19 | A1/C1 | Dimer diol | 36 | 1.2 | — | — | Spherical silica | 0.1 | 0.1 | A1/C1 | Dimer diol | 36 |

| | Layer B | | | | | | Cooling drum temperature °C. | Stretching | | | | Heat set temperature °C. |
|---|---|---|---|---|---|---|---|---|---|---|---|---|
| | Dimer component | | | Particle | | | | Ratio | | Temperature | | |
| | Mole fraction mol % | Blend | | Particle size μm | Addition amount wt % | Layer structure | | MD Times | TD Times | MD °C. | TD °C. | |
| | | Type | Ratio wt % | Type | | | | | | | | |
| Example41 | 2.3 | — | — | Spherical silica | 0.2 | 0.1 | 2-Layer of | 60 | 4.0 | 5.8 | 130 | 130 | 210 |
| Example42 | 1.5 | — | — | Spherical silica | 0.2 | 0.1 | LayerA and | 60 | 4.0 | 5.8 | 130 | 130 | 210 |
| Example43 | 2.2 | — | — | Spherical silica | 0.2 | 0.1 | LayerB | 60 | 4.0 | 5.8 | 130 | 130 | 210 |
| Example44 | 1.8 | — | — | Spherical silica | 0.2 | 0.1 | | 60 | 4.0 | 5.8 | 130 | 130 | 210 |
| Example45 | 1.8 | — | — | Spherical silica | 0.2 | 0.1 | | 60 | 3.7 | 5.8 | 130 | 130 | 210 |
| Example46 | 4.0 | — | — | Spherical silica | 0.2 | 0.1 | | 60 | 4.0 | 5.8 | 120 | 120 | 200 |
| Example47 | 1.4 | — | — | Spherical silica | 0.2 | 0.1 | | 60 | 4.0 | 5.8 | 130 | 130 | 210 |
| Example48 | 1.0 | — | — | Spherical silica | 0.2 | 0.1 | | 60 | 4.0 | 5.8 | 130 | 130 | 210 |
| Example49 | 2.3 | — | — | Spherical silica | 0.2 | 0.1 | | 60 | 4.0 | 5.8 | 130 | 130 | 210 |
| Example50 | 0.2 | — | — | Spherical silica | 0.2 | 0.1 | | 60 | 4.0 | 5.8 | 130 | 130 | 210 |
| Example51 | 1.8 | — | — | Cross-linked PSt | 0.2 | 0.15 | | 60 | 4.0 | 5.8 | 130 | 130 | 210 |
| Example52 | 2.3 | — | — | Spherical silica | 0.2 | 0.1 | | 25 | 3.6 | 4.0 | 90 | 90 | 210 |
| Example53 | 1.5 | — | — | Cross-linked PSt | 0.2 | 0.15 | | 25 | 3.6 | 4.0 | 90 | 90 | 210 |
| Example54 | 1.8 | — | — | Spherical silica | 0.2 | 0.1 | | 25 | 3.6 | 4.0 | 90 | 90 | 210 |
| Example55 | 1.2 | — | — | Cross-linked PSt | 0.25 | 0.1 | | 25 | 3.6 | 4.0 | 90 | 90 | 210 |
| Example56 | 1.2 | — | — | — | — | — | | 25 | 3.6 | 4.0 | 90 | 90 | 210 |
| Example57 | 2.3 | PEI | 10 | Cross-linked PSt | 0.2 | 0.15 | | 25 | 3.8 | 4.2 | 100 | 100 | 210 |
| Example58 | 1.5 | PEI | 10 | Cross-linked PSt | 0.2 | 0.15 | | 25 | 3.8 | 4.2 | 100 | 100 | 210 |
| Example59 | 2.3 | PEI | 10 | Cross-linked PSt | 0.2 | 0.15 | | 25 | 3.8 | 4.2 | 100 | 100 | 210 |
| Example60 | 1.2 | PEI | 10 | Cross-linked PSt | 0.2 | 0.15 | | 25 | 3.8 | 4.2 | 100 | 100 | 210 |
| Example61 | 1.2 | PEI | 10 | — | — | — | | 25 | 3.8 | 4.2 | 100 | 100 | 210 |
| Comparative Example15 | — | — | — | Spherical silica | 0.3 | 0.1 | | 25 | 3.6 | 4.0 | 90 | 90 | 210 |
| Comparative Example16 | — | — | — | Cross-linked PSt | 0.2 | 0.15 | | 25 | 3.6 | 4.0 | 90 | 90 | 210 |
| Comparative Example17 | — | — | — | Spherical silica | 0.2 | 0.1 | | 60 | 4.5 | 4.0 | 130 | 130 | 210 |
| Comparative Example18 | 5.0 | — | — | Spherical silica | 0.2 | 0.1 | | 60 | 4.0 | 5.8 | 110 | 110 | 200 |
| Comparative Example19 | 1.2 | — | — | Spherical silica | 0.2 | 0.1 | | 60 | 4.0 | 5.8 | 130 | 130 | 210 |

TABLE 5

| | Thickness | | | Young's modulus | | YMD × thickness | αt | | αh | | Roughness | | DMA | TMA stretch |
|---|---|---|---|---|---|---|---|---|---|---|---|---|---|---|
| | Film thickness μm | Layer A | Layer B | MD GPa | TD | GPa × μm | MD ppm/°C. | TD | MD ppm/%RH | TD | Layer A nm | Layer B | tanδ °C. | (110°C.) °C. |
| Example 41 | 3.0 | 0.9 | 2.1 | 6.0 | 10.0 | 18.0 | 12.6 | −6.7 | 9.5 | 5.1 | 2.8 | 5.0 | 141 | 1.0 |
| Example 42 | 3.0 | 0.9 | 2.1 | 6.0 | 10.0 | 18.0 | 12.5 | −6.8 | 9.4 | 5.2 | 2.5 | 4.7 | 137 | 1.1 |
| Example 43 | 3.0 | 0.9 | 2.1 | 6.0 | 10.0 | 18.0 | 12.5 | −6.6 | 9.3 | 5.1 | 2.7 | 4.9 | 140 | 1.0 |
| Example 44 | 3.0 | 0.9 | 2.1 | 6.0 | 10.0 | 18.0 | 11.9 | −3.8 | 10.1 | 5.4 | 2.8 | 5.1 | 143 | 1.0 |
| Example 45 | 2.5 | 0.8 | 2.1 | 5.5 | 10.5 | 13.8 | 15.9 | −5.6 | 10.9 | 4.9 | 2.8 | 5.1 | 143 | 1.4 |
| Example 46 | 3.5 | 1.0 | 2.5 | 5.5 | 10.5 | 19.3 | 15.5 | −5.1 | 10.4 | 4.6 | 2.4 | 4.6 | 120 | 1.9 |
| Example 47 | 3.5 | 1.0 | 2.5 | 6.0 | 10.0 | 21.0 | 12.0 | −3.9 | 10.0 | 5.5 | 2.7 | 4.9 | 142 | 1.0 |
| Example 48 | 3.5 | 1.0 | 2.5 | 6.0 | 10.0 | 21.0 | 11.8 | −3.7 | 10.2 | 5.6 | 2.6 | 4.8 | 142 | 1.0 |
| Example 49 | 3.5 | 3.0 | 0.5 | 6.0 | 10.0 | 21.0 | 11.9 | −3.8 | 10.1 | 5.5 | 2.3 | 4.6 | 139 | 1.0 |
| Example 50 | 3.5 | 3.0 | 0.5 | 6.0 | 10.0 | 21.0 | 12.0 | −3.7 | 9.9 | 5.4 | 2.2 | 4.7 | 141 | 1.0 |
| Example 51 | 3.0 | 0.9 | 2.1 | 6.0 | 10.0 | 18.0 | 11.8 | −3.9 | 10.1 | 5.5 | 2.6 | 4.6 | 143 | 1.0 |
| Example 52 | 3.5 | 1.1 | 2.4 | 5.0 | 5.5 | 17.5 | 12.3 | 9.0 | 10.9 | 8.9 | 2.7 | 4.7 | 121 | 1.3 |
| Example 53 | 3.5 | 3.0 | 0.5 | 5.0 | 5.5 | 17.5 | 12.5 | 9.1 | 10.8 | 8.7 | 2.3 | 4.7 | 117 | 1.3 |
| Example 54 | 3.5 | 1.1 | 2.4 | 5.0 | 5.5 | 17.5 | 12.7 | 9.1 | 10.5 | 8.5 | 2.7 | 4.6 | 122 | 1.3 |
| Example 55 | 3.5 | 3.0 | 0.5 | 5.0 | 5.5 | 17.5 | 12.6 | 9.0 | 10.7 | 8.6 | 2.3 | 4.7 | 118 | 1.3 |
| Example 56 | 3.5 | — | — | 5.0 | 5.5 | 17.5 | 12.5 | 9.1 | 10.4 | 8.5 | 1.4 | 4.3 | 118 | 1.3 |
| Example 57 | 3.5 | 1.1 | 2.4 | 5.0 | 5.5 | 17.5 | 12.9 | 9.0 | 11.0 | 8.7 | 2.8 | 4.8 | 129 | 1.3 |
| Example 58 | 3.5 | 3.0 | 0.5 | 5.0 | 5.5 | 17.5 | 12.8 | 9.2 | 10.8 | 8.6 | 2.2 | 4.6 | 127 | 1.1 |
| Example 59 | 3.5 | 1.1 | 2.4 | 5.0 | 5.5 | 17.5 | 12.5 | 9.1 | 10.7 | 8.8 | 2.7 | 4.7 | 130 | 1.1 |
| Example 60 | 3.5 | 3.0 | 0.5 | 5.0 | 5.5 | 17.5 | 12.7 | 9.0 | 10.9 | 8.9 | 2.2 | 4.7 | 128 | 1.1 |
| Example 61 | 3.5 | — | — | 5.0 | 5.5 | 17.5 | 12.6 | 9.2 | 11.0 | 8.7 | 1.3 | 4.4 | 131 | 1.1 |
| Comparative Example 15 | 3.8 | — | — | 5.0 | 6.0 | 19.0 | 12.6 | 5.8 | 12.1 | 10.2 | 7.5 | 7.6 | 120 | 0.7 |
| Comparative Example 16 | 5.0 | 1.5 | 3.5 | 5.0 | 6.0 | 25.0 | 12.6 | 5.8 | 12.1 | 10.2 | 2.3 | 4.7 | 120 | 0.7 |
| Comparative Example 17 | 3.0 | 0.9 | 2.1 | 7.6 | 6.0 | 22.8 | 5.2 | 12.5 | 9.6 | 12.0 | 2.8 | 5.2 | 150 | 0.5 |
| Comparative Example 18 | 3.5 | 1.1 | 2.4 | 5.0 | 9.5 | 17.5 | 19.3 | −2.0 | 11.4 | 5.2 | 2.7 | 5.1 | 112 | 3.7 |
| Comparative Example 19 | 5.0 | 1.5 | 3.5 | 5.5 | 10.5 | 27.5 | 15.8 | −5.5 | 10.8 | 5.1 | 2.9 | 5.1 | 139 | 1.2 |

| | Curl | | | Dimensional change in width ppm/N | Easiness of controlling tension (Environment change) | | | Electromagnetic conversion characteristics | Error rate | Dropout |
|---|---|---|---|---|---|---|---|---|---|---|
| | Direction — | Size mm | Processability | | A N | B N | A + B N | | | |
| Example 41 | A | 1.1 | Excellent | 984 | 0.22 | 0.35 | 0.57 | Good | Excellent | Good |
| Example 42 | B | 0.1 | Excellent | 984 | 0.23 | 0.36 | 0.58 | Good | Excellent | Good |
| Example 43 | A | 1.1 | Excellent | 984 | 0.22 | 0.35 | 0.57 | Good | Excellent | Good |
| Example 44 | A | 1.0 | Excellent | 984 | 0.26 | 0.31 | 0.57 | Good | Excellent | Good |
| Example 45 | A | 1.0 | Good | 1134 | 0.20 | 0.25 | 0.45 | Good | Excellent | Good |
| Example 46 | B | 0.1 | Good | 947 | 0.21 | 0.35 | 0.56 | Excellent | Excellent | Excellent |
| Example 47 | A | 0.7 | Excellent | 899 | 0.28 | 0.39 | 0.67 | Good | Excellent | Good |
| Example 48 | B | 0.8 | Excellent | 899 | 0.29 | 0.39 | 0.68 | Good | Excellent | Good |
| Example 49 | A | 1.4 | Excellent | 899 | 0.28 | 0.39 | 0.67 | Excellent | Excellent | Excellent |
| Example 50 | B | 1.2 | Excellent | 899 | 0.28 | 0.38 | 0.66 | Excellent | Excellent | Excellent |
| Example 51 | A | 0.8 | Excellent | 1085 | 0.23 | 0.30 | 0.54 | Good | Excellent | Good |
| Example 52 | A | 1.1 | Good | 999 | 0.48 | 0.13 | 0.61 | Good | Good | Good |
| Example 53 | B | 0.1 | Good | 999 | 0.48 | 0.12 | 0.60 | Excellent | Good | Excellent |
| Example 54 | A | 1.1 | Good | 999 | 0.47 | 0.11 | 0.58 | Good | Good | Good |
| Example 55 | B | 0.1 | Good | 999 | 0.47 | 0.12 | 0.59 | Excellent | Good | Excellent |
| Example 56 | B | 0.1 | Good | 999 | 0.47 | 0.11 | 0.58 | Excellent | Good | Excellent |
| Example 57 | A | 1.4 | Good | 999 | 0.48 | 0.12 | 0.60 | Good | Good | Good |
| Example 58 | B | 0.1 | Excellent | 999 | 0.47 | 0.11 | 0.59 | Excellent | Good | Excellent |
| Example 59 | A | 1.4 | Excellent | 999 | 0.48 | 0.12 | 0.61 | Good | Good | Good |
| Example 60 | B | 0.1 | Excellent | 999 | 0.48 | 0.13 | 0.61 | Excellent | Good | Excellent |
| Example 61 | B | 0.1 | Excellent | 999 | 0.48 | 0.12 | 0.60 | Excellent | Good | Excellent |
| Comparative Example 15 | A | 0.4 | Excellent | 954 | 0.55 | 0.29 | 0.84 | Poor | Poor | Poor |
| Comparative Example 16 | A | 0.3 | Excellent | 807 | 0.67 | 0.42 | 1.09 | Excellent | Poor | Good |
| Comparative Example 17 | B | 0.3 | Excellent | 832 | 0.72 | 0.20 | 0.92 | Good | Poor | Good |
| Comparative Example 18 | B | 0.1 | Poor | — | — | — | — | — | — | — |
| Comparative Example 19 | A | 0.1 | Excellent | 759 | 0.27 | 0.56 | 0.83 | Excellent | Excellent | Good |

INDUSTRIAL APPLICABILITY

A resin film of the present invention can be suitably used as a base film for a magnetic recording tape such as, in particular, a high-capacity data storage.

What is claimed is:

1. A resin film having a Young's modulus in the film longitudinal direction of 1 GPa or more and a film thickness of 1 μm or more,
    wherein the product of the Young's modulus in the longitudinal direction and the thickness is 5 GPa·μm or more and 20 GPa·μm or less,
    wherein a dimensional change in the film longitudinal direction is −2% or more and +2% or less when the film is heated at a rate of 5° C./min under a load of 2 kg/mm$^2$ applied in the longitudinal direction and the temperature has reached 110° C., and
    wherein the resin film satisfies at least either of the following (1) or (2):
        (1) the Young's modulus in the film longitudinal direction is 6 GPa or less and the film thickness is 4.5 μm or less; and
        (2) the Young's modulus in the film longitudinal direction is 4 GPa or less and the film thickness is 6 μm or less,
    wherein the resin film is formed of at least one resin selected from the group consisting of aromatic polyesters, polyether ketones, polyarylene sulfides, polyolefins, aliphatic polyamides, and semi-aromatic polyamides.

2. The resin film according to claim 1, wherein a tan δ peak temperature measured by DMA of a resin which forms the resin film is in the range of 100° C. or more.

3. The resin film according to claim 1, wherein the resin film is formed of at least the aromatic polyesters, and the aromatic polyesters are aromatic copolyesters in which dimer components represented by the following formulas (I) and (II) are copolymerized in the range of 0.3 to less than 5 mol % based on the number of moles of repeating units of the aromatic polyester:

—C(O)-RA-C(O)— (I) and

—O-RA-O— (II), wherein RA in the structural formulas (I) and (II) represents a $C_{31}$-$C_{51}$ alkylene group which may contain a cyclic ring(s) and a branched chain(s).

4. The resin film according to claim 1, wherein the resin film is a laminated film composed of two or more layers, the front and rear surfaces thereof having different degrees of roughness, wherein an average surface roughness Ra of a flatter layer is 0.5 nm or more and less than 4.0 nm.

5. The resin film according to claim 1, wherein the resin comprises a matrix resin and a heat resistant resin having a higher glass transition temperature than the matrix resin.

6. The resin film according to claim 5, wherein the heat resistant resin having a higher glass transition temperature than the matrix resin is at least one selected from the group consisting of polyimides, polyether imides, polyether ketones, and polyether ether ketones, and is contained in the resin in an amount in the range of 0.5 to 25 mass % based on the mass of the whole resin.

7. The resin film according to claim 1, wherein a temperature expansion coefficient and a humidity expansion coefficient in the film width direction are in the ranges of −8 to 10 ppm/° C. and 1 to 8.5 ppm/% RH, respectively.

8. The resin film according to claim 1, wherein the film is used as a base film of a magnetic recording tape.

9. The resin film according to claim 8, wherein the film is used as a base film of a high-density magnetic recording tape in which a track position is adjusted by controlling tension applied in the running direction of the magnetic recording tape.

* * * * *